(12) United States Patent
Moriya

(10) Patent No.: US 7,719,715 B2
(45) Date of Patent: May 18, 2010

(54) TONE CHARACTERISTICS-CONVERSION DETERMINING APPARATUS, TONE CHARACTERISTICS-CONVERSION DETERMINING METHOD, TONE CHARACTERISTICS-CONVERSION DETERMINING PROGRAM, IMAGE PROCESSING APPARATUS, AND IMAGE DISPLAY APPARATUS

(75) Inventor: Hidekuni Moriya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 793 days.

(21) Appl. No.: 11/470,783

(22) Filed: Sep. 7, 2006

(65) Prior Publication Data

US 2007/0081191 A1    Apr. 12, 2007

(30) Foreign Application Priority Data

Oct. 12, 2005   (JP)   ............................. 2005-297269
Oct. 18, 2005   (JP)   ............................. 2005-303370

(51) Int. Cl.
*H04N 1/40* (2006.01)
(52) U.S. Cl. ...................................... 358/2.1; 358/504
(58) Field of Classification Search ................. 358/1.9, 358/2.1, 500, 504, 516, 519–520, 523, 527
See application file for complete search history.

(56) References Cited

U.S. PATENT DOCUMENTS 5,754,448 A * 5/1998 Edge et al. .................. 358/516

6,876,382 B1 * 4/2005 Sakamoto ................. 348/207.2

FOREIGN PATENT DOCUMENTS

JP   A-09-304840    11/1997
JP   A-2002-300371   10/2002

OTHER PUBLICATIONS

IEC; "Project Team 61966: Colour Measurement and Management in Multimedia Systems and Equipment; Part 3: Equipment using cathode ray tubes"; June 23, 1998.

* cited by examiner

*Primary Examiner*—Thomas D Lee
*Assistant Examiner*—Stephen M Brinich
(74) *Attorney, Agent, or Firm*—Oliff & Berridge, PLC

(57) ABSTRACT

A tone-conversion-characteristic determining apparatus determines tone-conversion characteristics for use in converting tone characteristics of original data so that targeted tone characteristics are obtained when display is performed by a display device. The apparatus includes a tristimulus value determining unit that, on the basis of tristimulus values corresponding to a tone value of each of a plurality of colors capable of being displayed by the display device, determines a tristimulus value which is greater than the other tristimulus values, and a tone-conversion-characteristic determining unit that, on the basis of the tristimulus value determined by the tristimulus value determining unit, determines the tone-conversion characteristics so that the targeted tone characteristics are obtained.

15 Claims, 30 Drawing Sheets

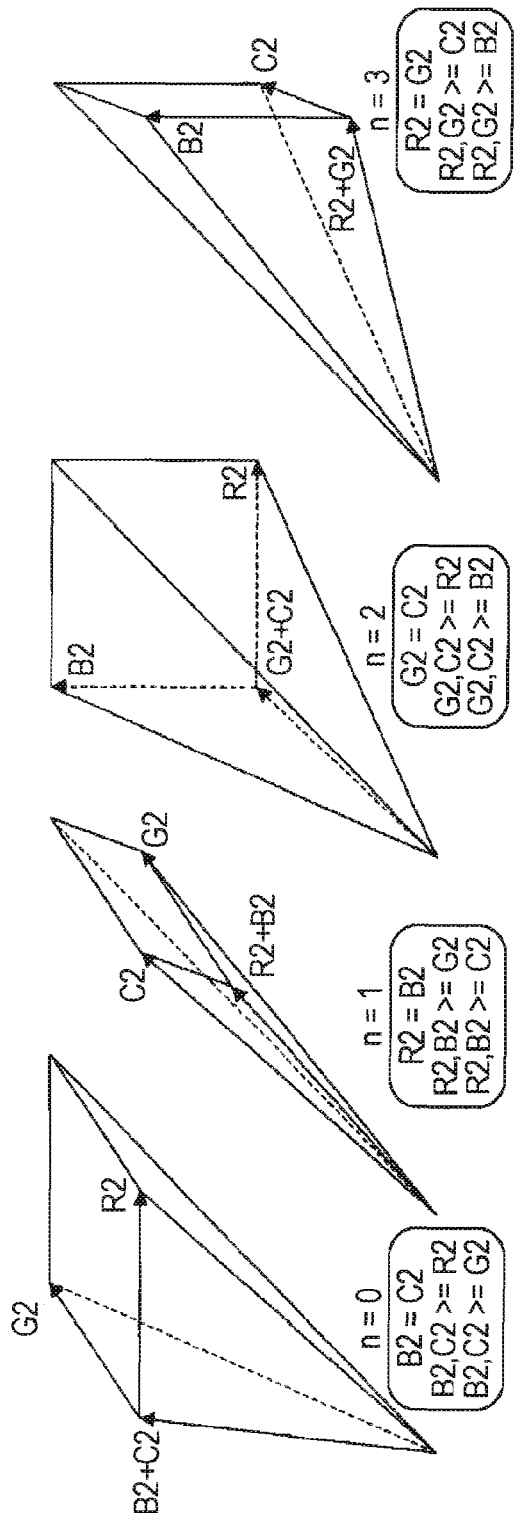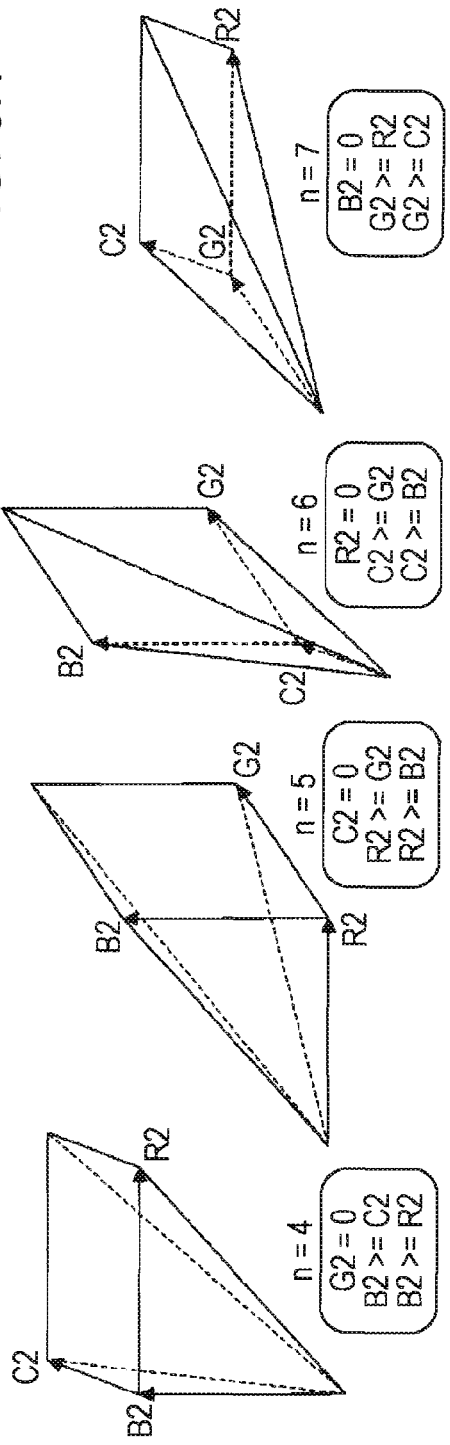

TONE CHARACTERISTICS-CONVERSION DETERMINING APPARATUS, TONE CHARACTERISTICS-CONVERSION DETERMINING METHOD, TONE CHARACTERISTICS-CONVERSION DETERMINING PROGRAM, IMAGE PROCESSING APPARATUS, AND IMAGE DISPLAY APPARATUS

BACKGROUND

1. Technical Field

The present invention relates to a tone characteristics-conversion determining apparatus, a tone characteristics-conversion determining method, and a tone characteristics-conversion determining program that determine tone characteristics-conversion for use in converting tone characteristics.

2. Related Art

An image processing apparatus for adjusting characteristics, such as tone characteristics, of a display apparatus such as a liquid crystal panel, has been known. For example, JP-A-9-304840 discloses a method for adjusting tone characteristics of a liquid crystal display panel by using a conversion table which is generated by using relationships between driving data of the liquid crystal display panel and the amount of transmitted light of the liquid crystal display panel. Also, JP-A-2002-300371 discloses a method that includes linearizing image data by performing inverse gamma correction and using the linearized image data to perform image processing. In addition, a method for separately calculating tone characteristics for red, green, and blue is described in a document entitled "IEC61966-3 Multimedia systems and equipment Colour measurement and management Part3: Equipment using cathode ray tubes". Accurately, this document does not disclose any correction method but simply describes a tone-characteristic calculating method.

In recent years, image display apparatuses hereinafter referred to as "multiprimary-color display apparatuses") that display images by using four or more primary colors (hereinafter referred to as "multiprimary colors") have been used. The above documents include no description of a method for appropriately adjusting tone characteristics of image data. In particular, tone characteristics cannot be appropriately adjusted for multiprimary-color image data.

SUMMARY

An advantage of the invention is that it provides a tone characteristics-conversion-determining apparatus, tone characteristics-conversion-characteristic method, and tone-conversion-characteristic determining program for appropriately determining tone-conversion characteristics for use in converting tone characteristics, an image processing apparatus for performing image processing by using tone-conversion characteristics, and an image display apparatus including a display device for displaying image data which is obtained by performing image processing by using tone-conversion characteristics.

According to an aspect of the invention, a tone-conversion-characteristic determining apparatus determines tone-conversion characteristics for use in converting tone characteristics of original data so that targeted tone characteristics are obtained when display is performed by a display device. The tone-conversion-characteristics determining apparatus includes a tristimulus value determining unit that, on the basis of tristimulus values corresponding to a tone characteristics value of each of a plurality of colors capable of being displayed by the display device, determines a tristimulus value which is greater than the other tristimulus values, and a tone-conversion-characteristic determining unit that, on the basis of the tristimulus value determined by the tristimulus value determining unit, determines the tone-conversion characteristics so that the targeted tone characteristics are obtained.

The tone-conversion-characteristics determining apparatus is used to determine tone-conversion characteristics for use in converting tone characteristics of original data so that targeted tone characteristics are obtained when display is performed by a display device. The tristimulus value determining unit determines, on the basis of tristimulus values corresponding to a tone characteristics value of each of a plurality of colors capable of being displayed by the display device, a tristimulus value which is greater than the other tristimulus values. The tone-conversion-characteristic determining unit determines, on the basis of the tristimulus value determined by the tristimulus value determining unit, the tone-conversion characteristics so that the targeted tone characteristics are obtained. According to the tone-conversion-characteristics determining apparatus, tone-conversion characteristics for use in converting tone characteristics can be accurately set.

It is preferable that the tristimulus values correspond to a maximum tone characteristics value of each of the colors, and it is preferable that the tristimulus value determining unit determines, as the tristimulus value, a greatest tristimulus value among the tristimulus values. Therefore, a simplified method can determine tone-conversion characteristics for in converting tone characteristics.

It is preferable that each of the targeted tone characteristics is such that a tone characteristics value obtained, for a normalized tone characteristics value of the original image data, by normalizing the tristimulus value, is linear. That is, the tone-conversion-characteristic determining unit determines the tone-conversion characteristics so that each of the tone characteristics is linear.

It is more preferable that each of the targeted tone characteristics is such that a tone characteristics value obtained, for a normalized tone characteristics value of the original image data, by normalizing the tristimulus value, is represented by a gamma characteristic prescribed on the basis of a specified gamma value. In this case, the tone-conversion-characteristic determining unit determines the tone-conversion characteristics so that each of the tone characteristics satisfies a gamma characteristic.

It is preferable that the plurality of colors include red, green, blue, and cyan. In this case, the tristimulus values have value X, value Y, and value Z, and it is preferable that the tristimulus value determining unit determines, as the tristimulus value, value X for the red, value Y for the green, value Z for the blue, or value Y for the cyan.

It is also preferable that the plurality of colors include red, green, blue, and yellow. In this case, the tristimulus values have value X, value Y, and value Z, and it is preferable that the tristimulus value determining unit determines, as the tristimulus value, value X for the red, value Y for the green, value Z for the blue, or value Y for the yellow.

In addition, it is preferable that the plurality of colors include red, green, blue, and white. In this case, the tristimulus values have value X, value Y, and value Z, and it is preferable that the tristimulus value determining unit determines, as the tristimulus value, value X for the red, value Y for the green, value Z for the blue, or value Y for the white.

It is preferable that colored regions in the plurality of colors include, in visible light ranges in which the hue of visible light changes depending on the wavelength of the visible light, a colored region having a hue of a blue range, a colored region having a hue of a red range, and two colored regions respectively having hues selected from hues of blue to yellow.

It is more preferable that colored regions in the plurality of colors include a colored region in which a wavelength peak of light passing through the colored region is 415 to 500 nanometers, a colored region in which a wavelength peak of light passing through the colored region is 600 nanometers or greater, a colored region in which a wavelength peak of light passing through the colored region is 485 to 535 nanometers, and a colored region in which a wavelength peak of light passing through the colored region is 500 to 590 nanometers.

The tone-conversion characteristics determined by the tone-conversion-characteristics determining apparatus may be preferably used in an image processing apparatus. In this case, the image processing apparatus includes a storage unit that stores, as tables, the tone-conversion characteristics, and an image processing nit that uses tables stored in the storage unit to perform image processing. Specifically, the image processing unit uses the tables to perform image processing on image data which is obtained such that a display device converts input image data into a plurality of colors capable of being displayed by the display device.

According to another aspect of the invention, a tone-conversion-characteristic determining method determines tone-conversion characteristics for use in converting tone characteristics of original data so that targeted tone characteristics are obtained when display is performed by a display device. The tone-conversion-characteristic determining method includes determining, on the basis of tristimulus values corresponding to a tone characteristics value of each of a plurality of colors capable of being displayed by the display device, a tristimulus value which is greater than the other tristimulus values, and determining, on the basis of the determined tristimulus value, the tone-conversion characteristics so that the targeted tone characteristics are obtained.

According to a further aspect of the invention, a tone-conversion-characteristic determining program to be executed by a computer allows the computer to function as tristimulus value determining means that, on the basis of tristimulus values corresponding to a tone characteristics value of each of a plurality of colors capable of being displayed by the display device, determines a tristimulus value which is greater than the other tristimulus values, and tone-conversion-characteristic determining means that, on the basis of the tristimulus value determined by the tristimulus value determining means, determines tone-conversion characteristics for use in converting tone characteristics of the original image data so that targeted tone characteristics are obtained when display is performed by the display device.

Also by executing the gamma-correction-table determining method and gamma-correction-table determining program (including a program recorded on a recording medium), tone-conversion characteristics for use in converting tone characteristics can be accurately set.

According to still another aspect of the invention, an image processing apparatus includes a tristimulus value determining unit that, on the basis of tristimulus values corresponding to a tone characteristics value of each of a plurality of colors capable of being displayed by a display device, determines a tristimulus value which is greater than the other tristimulus values, a tone-conversion-characteristic determining unit that, on the basis of the tristimulus value determined by the tristimulus value determining unit, determines tone-conversion characteristics for use in converting tone characteristics of the original image data so that the targeted tone characteristics are obtained when display is performed by the display device, and an image processing unit that performs image processing by using the tone-conversion characteristics. Therefore, by using appropriate tone-conversion characteristics, the image processing apparatus can perform image processing for accurately converting tone characteristics.

It is preferable that the tone-conversion-characteristic determining unit determines the tone-conversion characteristics on the basis of a specified gamma value, and it is preferable that the image processing unit performs gamma correction based on the determined tone-conversion characteristics.

In addition, the above image processing apparatus is preferably applicable to an image display apparatus including a display device for displaying image data.

BRIEF DESCRIPTION OF THE DRAWINGS

The invention will be described with reference to the accompanying drawings, wherein like numbers reference like elements.

FIGS. 6A to 6H are illustrations of quadrangular pyramids formed by dividing a polyhedron representing a color reproduction region.

DESCRIPTION OF EXEMPLARY EMBODIMENTS

Preferred embodiments of the invention are described with reference to the accompanying drawings. An image display apparatus capable of displaying images by using multiprimary colors as a plurality of colors is exemplified for description.

First Embodiment

A first embodiment of the invention is described below.

Entire Configuration

Figure 1:
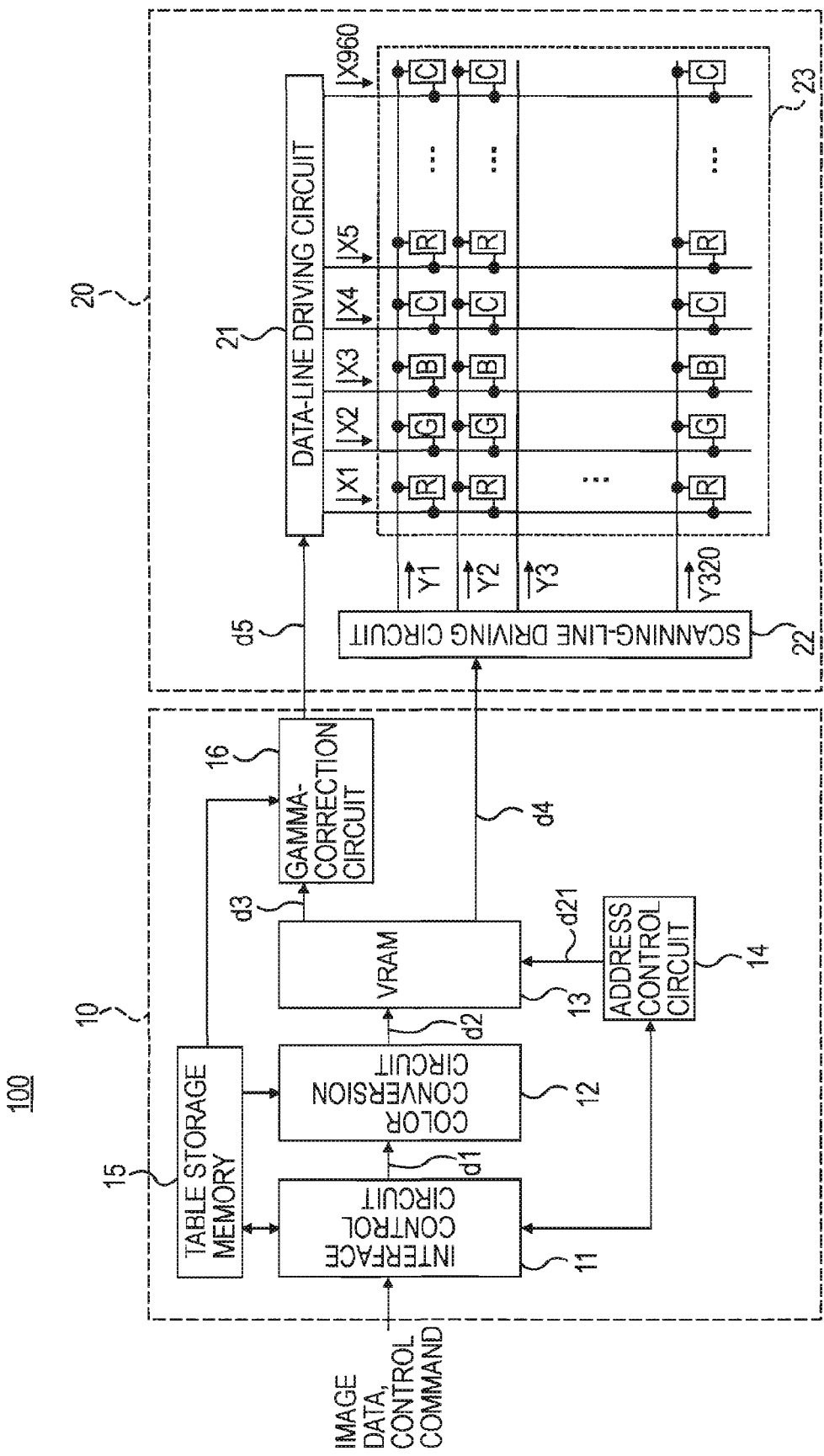
FIG. 1 is a schematic block diagram showing the configuration of an image display apparatus according to a first embodiment of the invention.

FIG. 1 is a schematic block diagram showing the configuration of an image display apparatus 100 according to the first embodiment of the invention. The image display apparatus 100 includes an image processing unit 10 for externally acquiring image data and a control command and performing image processing, and a display unit 20 for displaying image data which is obtained by the image processing by the image processing unit 10. The image display apparatus 100 can display images by using multiprimary colors. Specifically, the image display apparatus 100 can display four primary colors, red, green, blue, and cyan (hereinafter referred to simply as "R", "G", "B", and "C").

The image processing unit 10 includes an interface control circuit 11, a color conversion circuit 12, a VRAM (video random access memory) 13, an address control circuit 14, a table storage memory 15, and a gamma correction circuit 16.

The interface control circuit 11 acquires image data and a control command from the exterior (for example, a camera or the like) and supplies image data d1 to the color conversion circuit 12. The image data supplied from the exterior includes three primary colors, R, G, and B.

The color conversion circuit 12 performs, on the acquired image data d1, tone-characteristic-converting table conversion (hereinafter referred to as "1DLUT (1-Dimentional Look-Up-Table) conversion") and conversion of three primary colors to four primary colors. In this case, the color conversion circuit 12 performs processing by referring to data or the like stored in the table storage memory 15. Image data d2 obtained in image processing by the 12 is written in the VRAM 13. The image data d2 written in the VRAM 13 is read as image data d3 by the gamma correction circuit 16 on the basis of a control signal d21 from the address control circuit 14. The image data d2 is also read as address data d4 (based on which synchronization is established) by a scanning-line driving circuit 22 in the display unit 20. By referring to the data or the like stored in the table storage memory 15, the gamma correction circuit 16 performs gamma correction on the acquired image data d3. The gamma correction circuit 16 supplies image data d5 obtained by the gamma correction to a data line driving circuit 21. In such a manner, the image processing unit 10 functions as an image processor.

The display unit 20 includes the data-line driving circuit 21, the scanning-line driving circuit 22, and a display panel 23. The data-line driving circuit 21 supplies data line driving signals X1 to X960 to 960 data lines. The scanning-line driving circuit 22 supplies scanning line driving signals Y1 to Y320 to 320 scanning lines. In this case, the data-line driving circuit 21 and the scanning-line driving circuit 22 drive the display panel 23, with both synchronized with each other. The display panel 23 is formed by a liquid crystal display or the like. A voltage is applied to scanning lines and data lines, whereby the display panel 23 can display images, such as characters and video to be displayed. The display unit 20 functions as a display.

Figure 2:
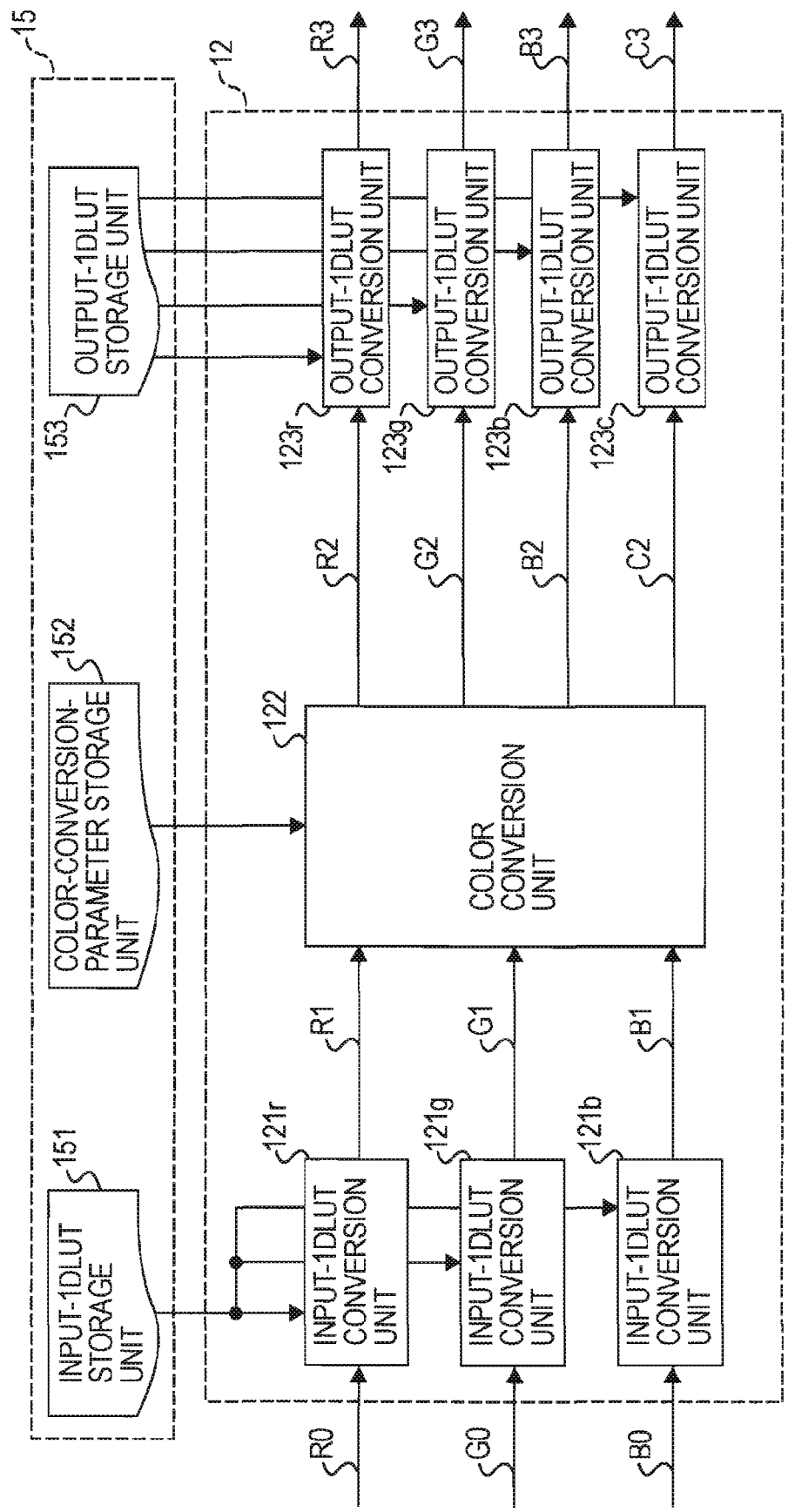
FIG. 2 is a block diagram showing specific configurations of a color conversion circuit and table storage memory in the first embodiment.

FIG. 2 is a block diagram showing specific configurations of the above-described color conversion circuit 12 and table storage memory 15. The color conversion circuit 12 includes input-1DLUT conversion units 121r, 121g, and 121b, a color conversion unit 122, and output-1DLUT conversion units 123r, 123g, 123b, and 123c. The table storage memory 15 includes an input-1DLUT storage unit 151, a color-conversion-parameter storage unit 152, and an output-1DLUT storage unit 153.

The input-1DLUT conversion units 121r to 121b perform 1DLUT conversion (hereinafter referred to as "input-1DLUT conversion") on input image data items R0, G0, and B0 by using a 1DLUT (hereinafter referred to as a "input 1DLUT") stored in the input-1DLUT storage unit 151. The reason that the input-1DLUT conversion is performed is to linearize the input image data items R0, G0, and B0 since the input image data items R0, G0, and B0 are obtained by gamma conversion with a normal camera or the like. The image data items R0, G0, and B0 correspond to the image data d1. The image data item R0 corresponds to a primary color of red, the image data G0 corresponds to a primary color of green, and the image data item B0 corresponds to a primary color of blue. In the following description, symbols in which the letters "R", "G", "B", and "C" are followed by numerals represent primary colors.

Figure 3:
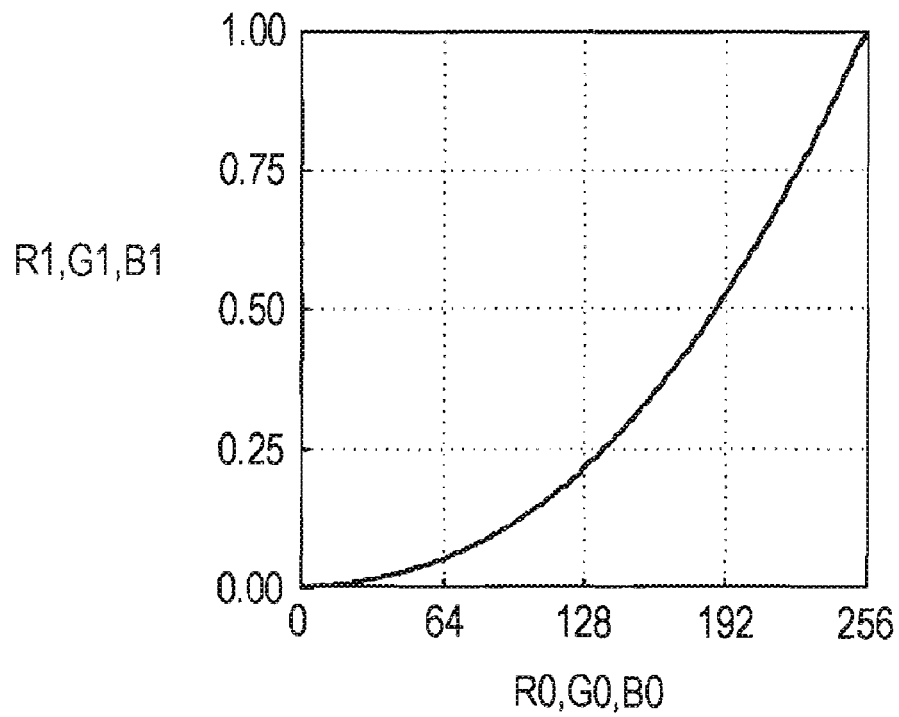
FIG. 3 is a graph showing a specific example of an input 1DLUT.

FIG. 3 shows a specific example of the input 1DLUT. The horizontal axis represents the image data items R0, G0, and B0 input to the input-1DLUT conversion units 121r to 121b, while the vertical axis represent image data items R1, G1, and B1 (i.e., image data items obtained by the input-1DLUT conversions which are output from the input-1DLUT conversion units 121r to 121b. Although, in this case, the input-1DLUT conversion is separately performed on each of the image data items R0, G0, and B0, the same input 1DLUT is used.

Referring back to FIG. 2, the image data items R1, G1, and B1 obtained by the input-1DLUT conversion are supplied to the color conversion unit 122. The color conversion unit 122 performs color conversion from three primary colors to four primary colors on the image data items R1, G1, and B1 by using color conversion parameters stored in the color-conversion-parameter storage unit 152. Specifically, the color conversion unit 122 converts the three primary colors, R, G, and B to four primary colors, R, G, B, and C, in which cyan is added to the three primary colors. The color conversion unit 122 supplies image data items R2, G2, B2, and C2 obtained by the color conversion to the output-1DLUT conversion units 123r to 123c, respectively. The color conversion in the color conversion unit 122 is later described in detail.

The output-1DLUT conversion units 123r to 123c perform 1DLUT conversion (hereinafter referred to as "output-1DLUT conversion") on the image data items R2, G2, B2, and C2 by using a 1DLUT (output 1DLUT) stored in the output-1DLUT storage unit 153. The output-1DLUT conversion units 123r to 123c output image data items R3, G3, B3, and C3 obtained by the output-1DLUT conversion to the above-described VRAM 13. The image data items R3, G3, B3, and C3 correspond to the above-described image data item d2. As described above, the output-1DLUT conversion units 123r to 123c function as an image processor. Details of the output-1DLUT used by the output-1DLUT conversion units 123r to 123c are described later.

Color Conversion Method

Next, a method for the color conversion is specifically described with reference to FIGS. 4 to 8.

Figure 4:
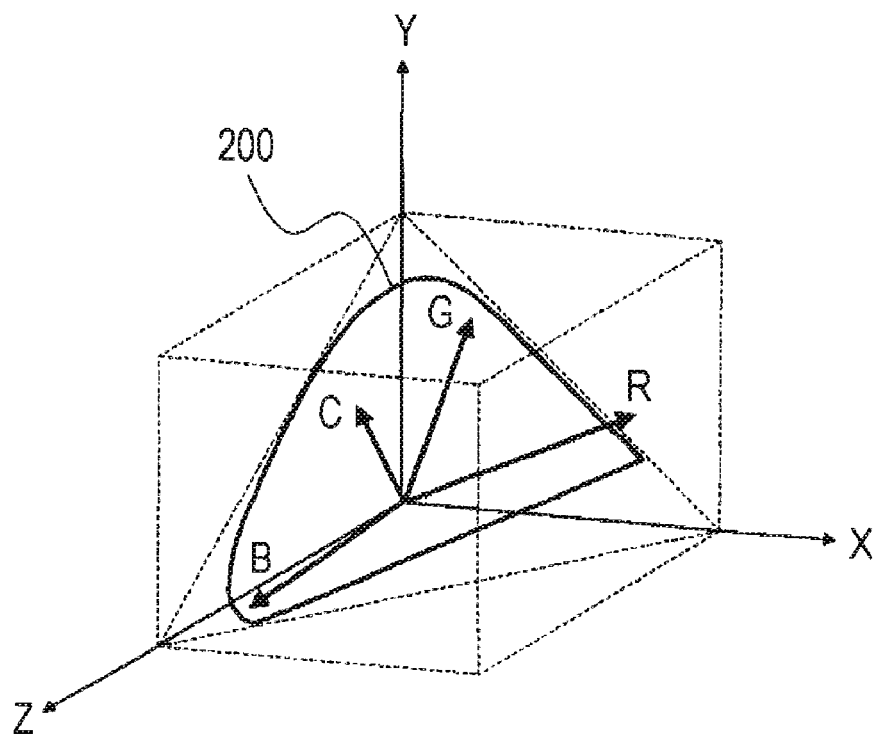
FIG. 4 is a graph showing a color reproduction region represented by R, G, B, and C.

FIG. 4 is a graph showing a color reproduction region represented by converted R, G, B, and C in a three-dimensional space of tristimulus values X, Y, and Z representing colors. As shown in FIG. 4, in a horseshoe spectrum locus 200, R, G, B, and C are indicated as vectors, respectively. In this specification, tristimulus values are represented by X, Y, and Z.

Figure 5A:
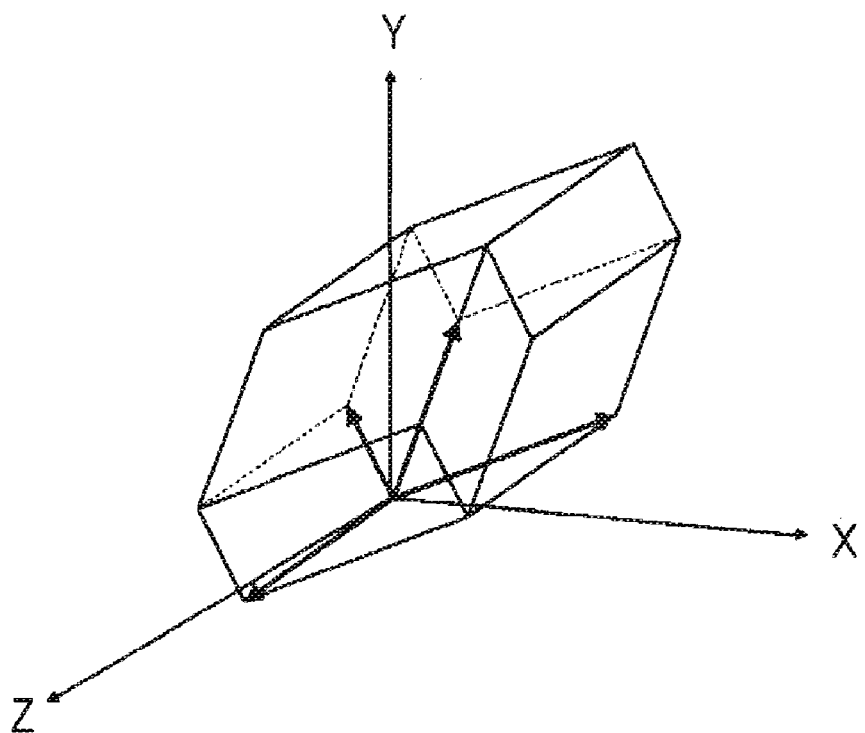
FIGS. 5A and 5B are specific illustrations of color conversion.
Figure 5B:
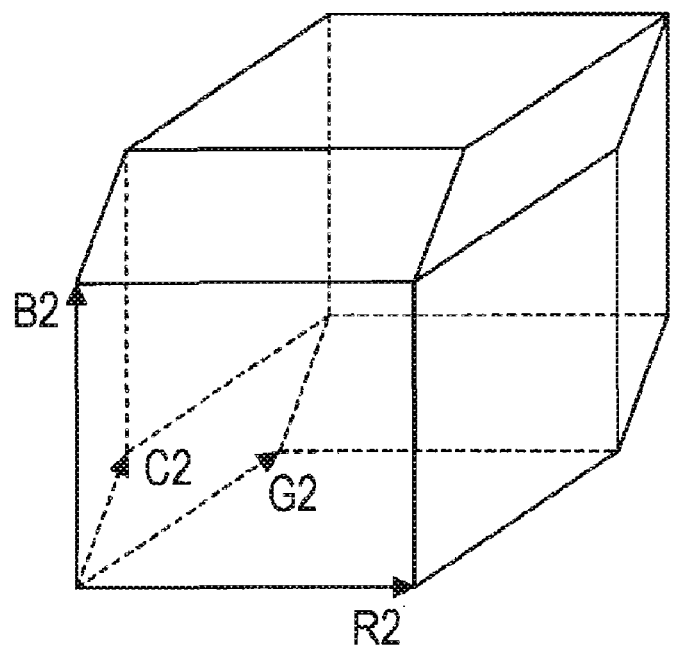

FIGS. 5A and 5B are specific illustrations of color conversion. FIG. 5A is a graph showing a color reproduction region as a polyhedron. This polyhedron is formed by vectors corresponding to primary colors. In the case of N primary colors, the polyhedron is an N(N-1) polyhedron. FIG. 5B is an illustration of color conversion from primary colors to four primary colors. Specifically, FIG. 5B shows a dodecahedron color-reproduction region formed by four primary colors, R2, G2, B2, and C2. The color conversion is performed in order to represent tristimulus values X, Y, and Z by using R2, G2, B2, and C2. Specifically, tristimulus values Xi, Yi, and Zi representing a color are obtained by multiplying the image data items R1, G1, and B1 obtained by the input-1DLUT conversion by matrix M which is represented by $$\begin{pmatrix} Xi \\ Yi \\ Zi \end{pmatrix} = M \begin{pmatrix} R1 \\ G1 \\ C1 \end{pmatrix} \quad (1)$$

Matrix M is determined beforehand depending on characteristics, etc., of the image display apparatus 100.

FIGS. 6A to 6H show quadrangular pyramids formed by dividing a polyhedron representing a color reproduction region. Although the purpose of color conversion is to represent the tristimulus values by R2, G2, B2, and C2, as described above, the number of variables to be obtained is more than the number of dimensions. Thus, by dividing the polyhedron representing the color reproduction region, conditions of constraint are supplied to the variables. In other words, by reducing the number of variables, calculation for color conversion is performed. Specifically, FIGS. 6A to 6H show eight regions formed by dividing the dodecahedron shown in FIG. 5B. As shown in FIGS. 6A to 6H, the eight regions are all quadrangular pyramids. Referring to FIG. 6A (the quadrangular pyramid represented by "n=0") as a typical example, the quadrangular pyramid is represented by three vectors, "B2+C2", "R2", and "G2", and a condition of constraint, represented by "B2=C2", is given. In this case, "B2, C2≦R2" and "B2, C2≦G2" serve as conditions that an input image data item is located in the quadrangular pyramid.

Figure 7:
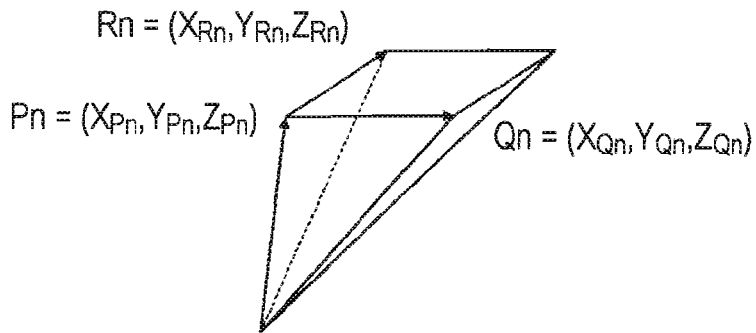
FIG. 7 is an illustration of a method for calculating R2, G2, B2, and C2.

FIG. 7 is an illustration of a method for calculating R2, G2, B2, and C2. Each quadrangular pyramid obtained by dividing the polyhedron representing the color reproduction region is represented by Pn, Qn, and Rn, where "Rn" is unrelated to red representing a color. Each of vectors Pn, Qn, and Rn has X, Y, and Z component values. For calculating R2, G2, B2, and C2, first, by using X, Y, and Z components of vectors Pn, Qn, and Rn, and the above tristimulus values Xi, Yi, and Zi, Pn, Qn, and Rn are calculated, where "rn" is unrelated to red representing a color. Specifically, calculation represented by $$\begin{pmatrix} pn \\ qn \\ rn \end{pmatrix} = \begin{pmatrix} X_{Pn} & X_{Qn} & X_{Rn} \\ Y_{Pn} & Y_{Qn} & Y_{Rn} \\ Z_{Pn} & Z_{Qn} & Z_{Rn} \end{pmatrix}^{-1} \begin{pmatrix} Xi \\ Yi \\ Zi \end{pmatrix} \quad (2)$$

is performed, where n represents an integer of 0 to 7. When the calculated Pn, Qn, and Rn satisfy predetermined conditions (hereinafter referred to as "conditions A"), R2, G2, B2, and C2 are obtained from Pn, Qn, and Rn correspondingly to settings of R2, G2, B2, and C2 in each region. In detail, conditions A are represented by $$\begin{cases} 0 \le pn, qn, rn \le 1 \\ pn \ge qn \\ pn \ge rn \end{cases} \quad (3)$$

By using conditions A, it can be determined whether or not Pn, Qn, and Rn are located in the quadrangular pyramid represented by n.

Figure 8:
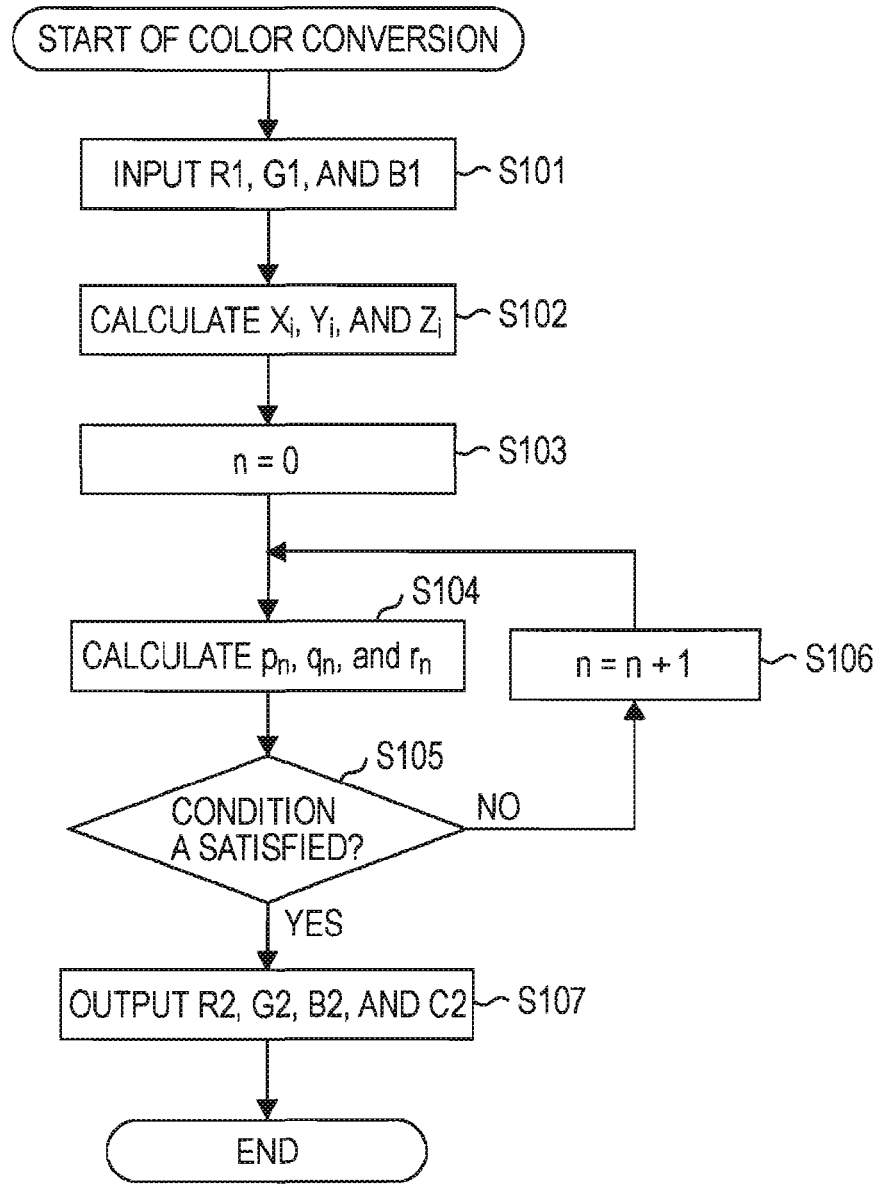
FIG. 8 is a flowchart showing a color conversion process.

FIG. 8 is a specific flowchart showing an actually executed color conversion process. The color conversion process is executed by the color conversion unit 122 in the color conversion circuit 12.

First, in step S101, image data items R1, G1, and B1 are input from the input-1DLUT conversion units 121r to 121b to the color conversion unit 122. Proceeding to step S102, the color conversion unit 122 calculates tristimulus values Xi, Yi, and Zi by using expression (1). The process proceeds to step S103.

In step S103, the color conversion unit 122 sets variable n to "0". The process proceeds to step S104. In step S104, the color conversion unit 122 uses expression (2) to calculate Pn, Qn, and Rn. Proceeding to step S105, the color conversion unit 122 determines whether or not the values Pn, Qn, and Rn calculated in step S104 satisfy conditions A. That is, in step S105, it is determined whether or not Pn, Qn, and Rn are located in the divided region.

If Pn, Qn, and Rn satisfy conditions A (Yes in step S105), the process proceeds to step S107. In this case, in step S107, the color conversion unit 122 finds R2, G2, B2, and C2 from Pn, Qn, and Rn correspondingly to settings of R2, G2, B2, and C2 in each region, and outputs R2, G2, B2, and C2. The process finishes.

If Pn, Qn, and Rn do not satisfy conditions A (No in step S105), the process proceeds to step S106. In this case, Pn, Qn, and Rn are not located in the divided region. Accordingly, in step S106, the color conversion unit 122 adds "1" to variable n. The process returns to step S104, and the subsequent steps are performed, with new variable n used.

Output-1DLUT Determining Method

Next, an output-1DLUT determining method according to the first embodiment is specifically described with reference to FIGS. 9A to 19.

First, display characteristics of the image display apparatus 100 capable of displaying images by using four primary colors, R, G, B, and C, are briefly described below.

Figure 9A:
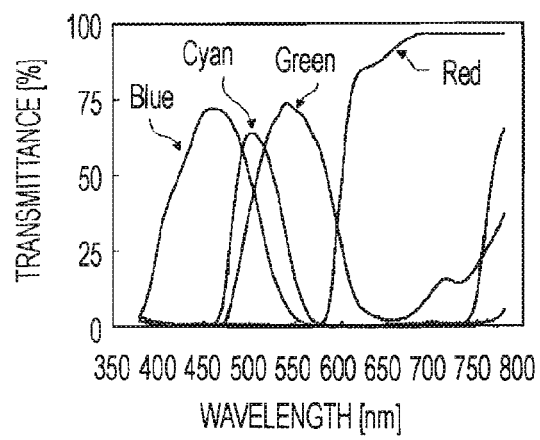
FIGS. 9A to 9D are graphs of examples of display characteristics of a display unit 20 in the first embodiment.
Figure 9B:
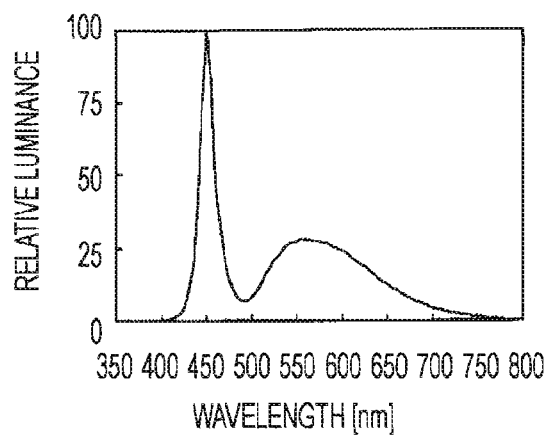
Figure 9C:
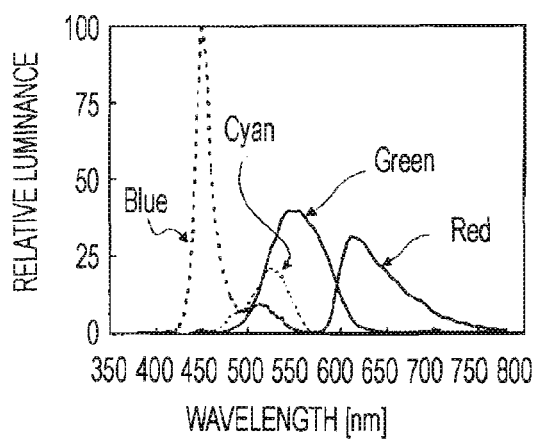
Figure 9D:
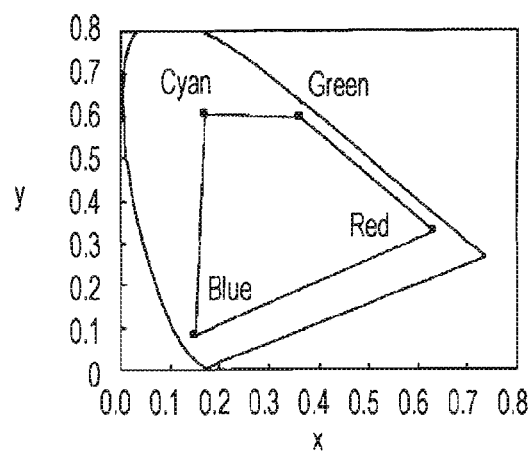

FIGS. 9A to 9D are graphs of examples of display characteristics of the display unit 20 in the image display apparatus 100. FIG. 9A is a graph of spectral characteristics of color filters used in the display unit 20. The horizontal axis represents a wavelength (nanometers (nm)), and the vertical axis represents a transmittance (%). FIG. 9B is a graph of luminous characteristics of a backlight used as a light source. The horizontal axis represents a wavelength (nm), and the vertical axis represents a relative luminance (%). FIG. 9C is a graph in which light transmission characteristics are reflected for the luminous characteristics of the backlight. That is, FIG. 9C is a graph of luminous characteristics of four primary colors. Also in FIG. 9C, the horizontal axis represents a wavelength (nm), and the vertical axis represents a relative luminance. Although control of transmitted light is performed by liquid crystal, the control is not shown since transmission characteristics of the transmitted light are substantially flat. FIG. 9D is a graph formed by calculating color-representing tristimulus values for luminous characteristics of four primary colors and plotting the values on an xy chromaticity diagram. The inside of the quadrangle in FIG. 9D indicate colors that can be reproduced, and this quadrangle corresponds to the color reproduction region in the display unit 20 of the image display apparatus 100. In addition, vertices of the quadrangle correspond to primary colors of R, G, B, and C.

Next, determination of the output 1DLUT for use in the output-1DLUT conversion is described below.

In the first embodiment, in order for desired tone characteristics to be obtained when the display unit 20 displays an image, tone conversion characteristics for use in converting tone characteristics of the original image data are determined. Specifically, on the basis of tristimulus values X, Y, and Z corresponding to the tone characteristics value of each primary color included in multiprimary colors, a tristimulus value that is greater than the other tristimulus values is determined, and, on the basis of the determined tristimulus value, tone-conversion characteristics are determined. Specifically, in the first embodiment, after tristimulus values X, Y, and Z for a tone characteristics value of each of primary colors of R, G, B, and C are obtained, a tristimulus value that is greater than the other tristimulus values is determined. In addition, by using a linear characteristic as a desired characteristic, on the basis of the determined tristimulus value and linear characteristic, a tone-conversion characteristic for use in converting the tone characteristic is determined for each of R, G, B, and C. This tone-conversion characteristic corresponds to the output 1DLUT.

Figure 10:
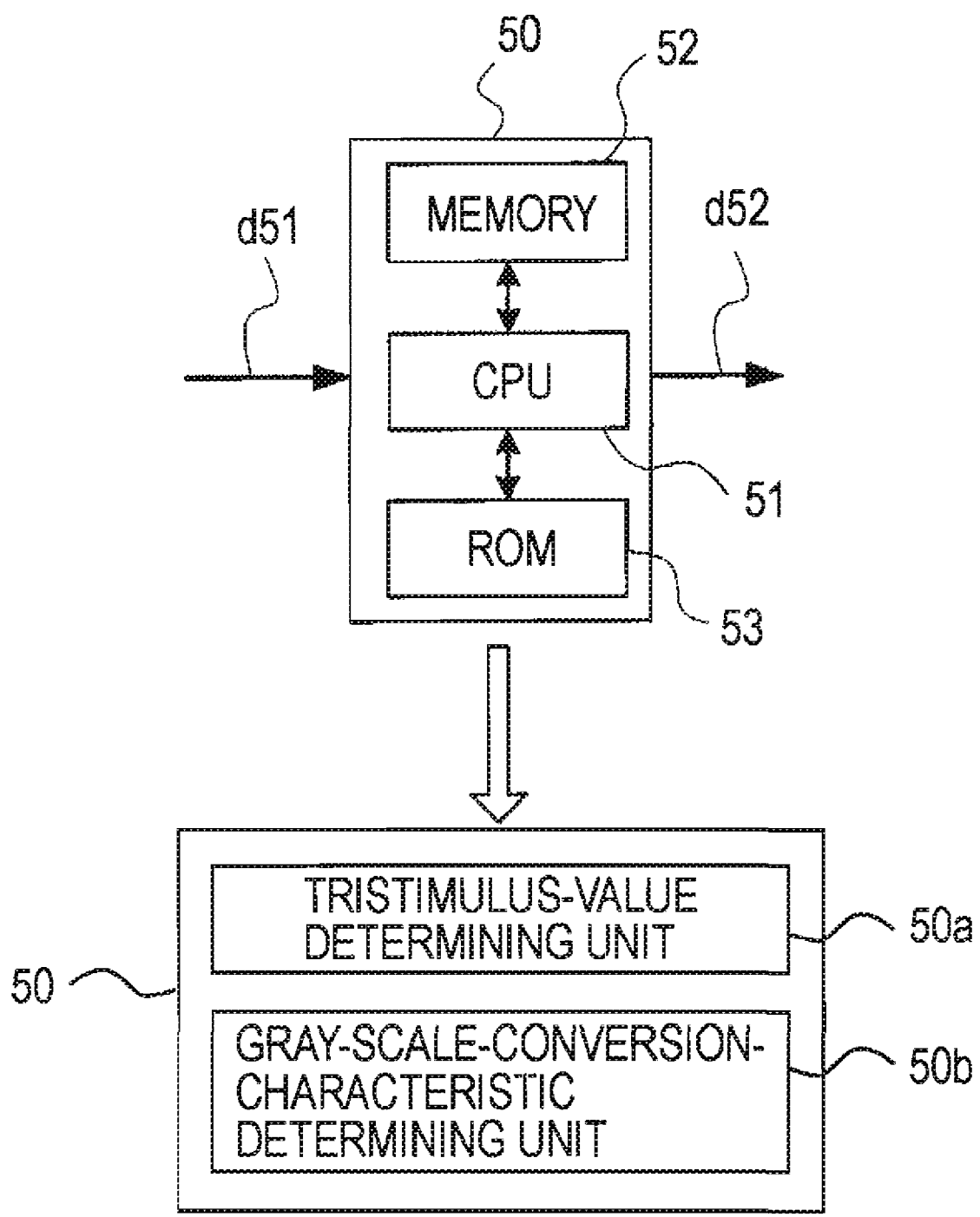
FIG. 10 is a schematic configuration of a tone-conversion-characteristic determining apparatus.

FIG. 10 is a schematic configuration of a tone-conversion-characteristic determining apparatus 50 for determining the output 1DLUT. The tone-conversion-characteristics determining apparatus 50 includes a CPU 51, a memory 52, and a ROM 53.

Tristimulus values X, Y, and Z corresponding to each of image data items R3, G3, B3, and C3 are input as data d51 to the tone-conversion-characteristic determining apparatus 50. The ROM 53 stores a tone-conversion-characteristic determining program, and the CPU 51 reads and executes the tone-conversion-characteristic determining program stored in the ROM 53. This allows the tone-conversion-characteristic determining apparatus 50 to function as a tristimulus-value determining unit 50a and as a tone-conversion-characteristic determining unit 50b to determine tone-conversion characteristics. In the first embodiment, the tone-conversion-characteristic determining apparatus 50 determines the output 1DLUT as tone-conversion characteristics. The memory 52 outputs the output 1DLUT as data d52. The output 1DLUT output from the tone-conversion-characteristic determining apparatus 50 is stored in the table storage memory 15, or the like, of the image display apparatus 100. Determination of the output 1DLUT is not limited to execution of the tone-conversion-characteristic determining program stored in the tone-conversion-characteristic determining apparatus 50. In another example, a computer reads a tone-conversion-characteristic determining program stored on a recording medium (such as an optical disc), whereby the computer functions as a tristimulus-value determining unit and a tone-conversion-characteristic determining unit 50b to determine the output 1DLUT.

FIGS. 11A to 14D are graphs showing a method, performed by the tone-conversion-characteristic determining apparatus 50, for determining the output 1DLUT for R, G, B, and C.

Figure 11A:
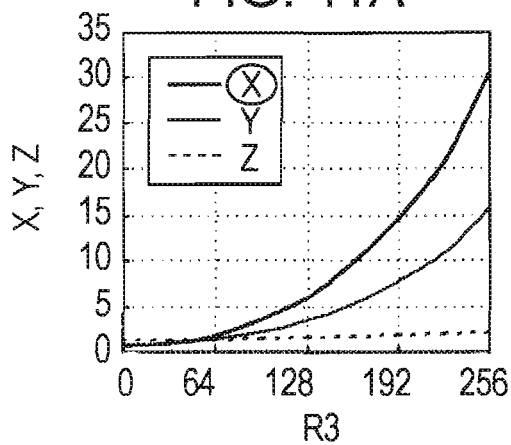
FIGS. 11A to 11D are graphs illustrating a method for determining the output 1DLUT for red.

FIGS. 11A to 11D are graphs illustrating a method for determining the output 1DLUT for red. FIG. 11A is a graph showing tristimulus values X, Y, and Z (on the vertical axis) for tone characteristics values (on the horizontal axis) of image data item R3 representing red, the tristimulus values being obtained by measurement or the like. FIG. 11A indicates that, regarding image data item R3, among tristimulus values X, Y, and Z, value X is greater than the other tristimulus values. Therefore, regarding image data item R3, value X among tristimulus values X, Y, and Z is determined as a greater value.

Figure 11B:
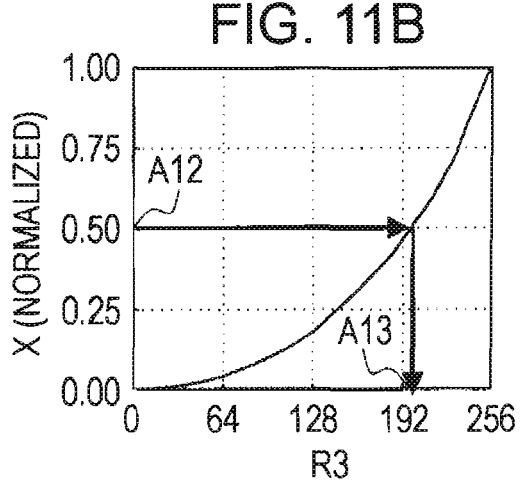
Figure 11C:
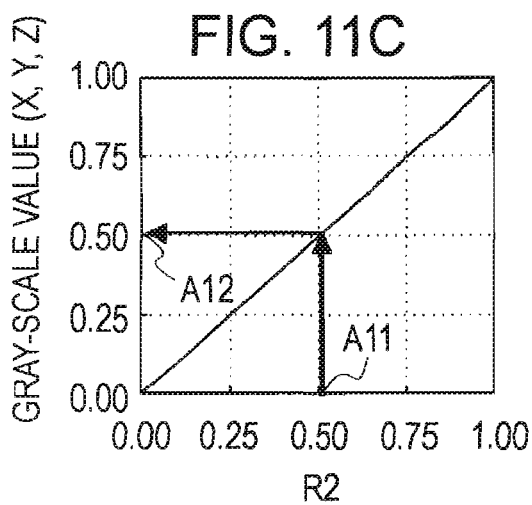

After the tristimulus value that is greater than the other tristimulus values is determined as described above, the determined value, value X, is normalized. In FIG. 11B, the horizontal axis represents a tone characteristics values of image data item R3, and the vertical axis represents the normalized X (having a value between 0 and 1). Next, a desired characteristic to be satisfied by tone characteristics values of an image data item is acquired. FIG. 11C shows a linear characteristic as a specific example of the desired characteristic. In FIG. 11C, the horizontal axis represents a normalized tone characteristics value of image data item R2 input to the output-1DLUT conversion unit 123r, and the vertical axis represents a tone characteristics value of tristimulus values X, Y, and Z, specifically, a normalized tone characteristics value of X.

By using the relationships shown in FIGS. 11B and 11C, the output 1DLUT is determined. Specifically, first, by using the linear characteristic shown in FIG. 11C, tone characteristics values of tristimulus values X, Y, and Z which are to be obtained from image data item R2 input to the output-1DLUT conversion unit 123r are obtained. Specifically, from tone characteristics value A11 of image data item R2, tone characteristics value A12 of the tristimulus values are obtained. Next, by using the relationship in FIG. 11B, for X among the tristimulus values, image data item R3 to be output from the output-1DLUT conversion unit 123r is obtained. Specifically, from tone characteristics value A12 of X corresponding to the above tone characteristics value A11, tone characteristics value A13 of image data item R3 is obtained. In other words, from tone characteristics value A11 of image data item R2, tone characteristics value A13 of image data item R3 is obtained.

Figure 11D:
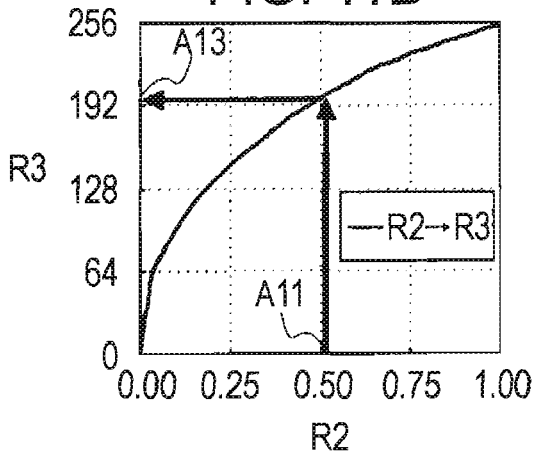

As described above, the relationship between image data item R2 input to the output-1DLUT conversion unit 123r and image data item R3 to be output form the output-1DLUT conversion unit 123r, that is, an output 1DLUT (tone-conversion characteristics) to be used for image data item R2 by the output-1DLUT conversion unit 123r, is determined. FIG. 11D shows the output 1DLUT for read. Specifically, the horizontal axis represents image data item R2 input to the output-1DLUT conversion unit 123r, and the vertical axis represents image data item R3 (obtained by the output-1DLUT conversion) output from the output-1DLUT conversion unit 123r. For example, by performing, on image data item R2 having tone characteristics value A11, conversion using the output 1DLUT, image data item R3 having tone characteristics value A13 is obtained.

Figure 12A:
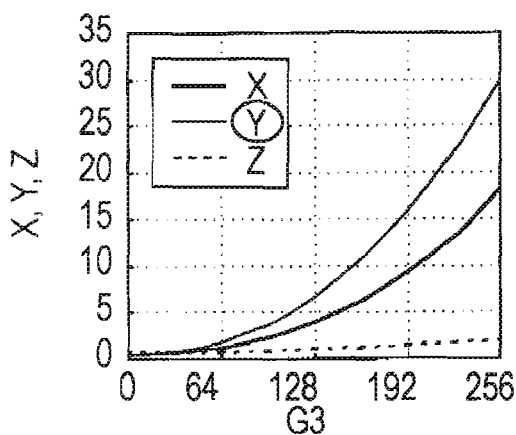
FIGS. 12A to 12D are graphs illustrating a method for determining an output 1DLUT for green.
Figure 12B:
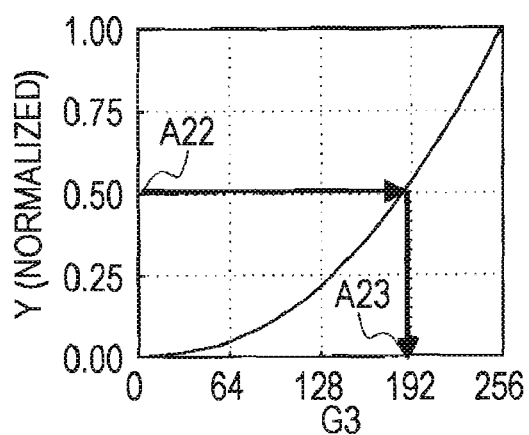
Figure 12C:
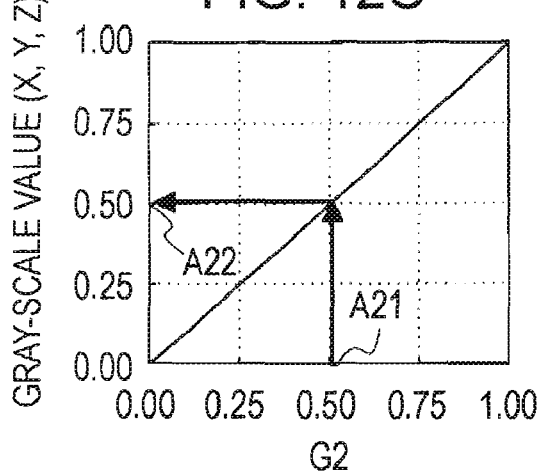

FIGS. 12A to 12D are graphs illustrating a method for determining an output 1DLUT for green. FIG. 12A is a graph showing tristimulus values X, Y, and Z (on the vertical axis) for tone characteristics values (on the horizontal axis) of image data item G3 representing red, the tristimulus values being obtained by measurement or the like. FIG. 11A indicates that, regarding image data item G3, among tristimulus values X, Y, and Z, value Y is greater than the other tristimulus values. Therefore, regarding image data item G3, value Y among the tristimulus values X, Y, and Z is determined as a greater value.

Figure 12D:
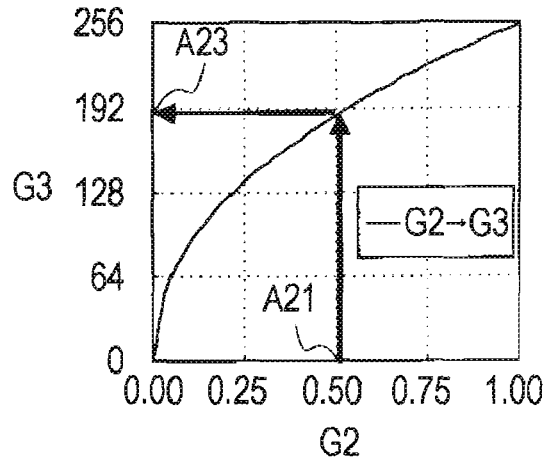

After the tristimulus value that is greater than the other tristimulus values is determined as described above, in the above-described process, normalization (see FIG. 12B) of the determined Y and acquisition (see FIG. 12C) of a linear characteristic are performed. By reading, in the linear characteristic shown in FIG. 12C, a value on the vertical axis on the basis of a value on the horizontal axis, and associating the read value with a value on the vertical axis of the normalized Y shown in FIG. 12B, a value on the horizontal axis is read. Specifically, tone characteristics value A22 of Y is obtained from tone characteristics value A21 of image data item G2, and tone characteristics value A23 of image data item G3 is obtained from tone characteristics value A22 of Y. As shown in FIG. 12D, this determines the relationship between image data item G2 input to the output-1DLUT conversion unit 123g and image data item G3 to be output from the output-1DLUT conversion unit 123, that is, an output 1DLUT to be used for image data item G2 by the output-1DLUT conversion unit 123g.

Figure 13A:
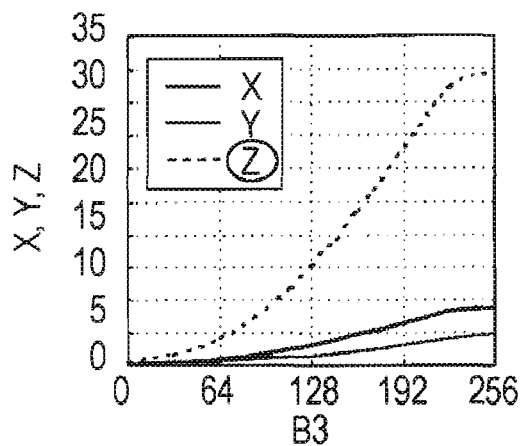
FIGS. 13A to 13D are graphs illustrating a method for determining an output 1DLUT for blue.
Figure 13B:
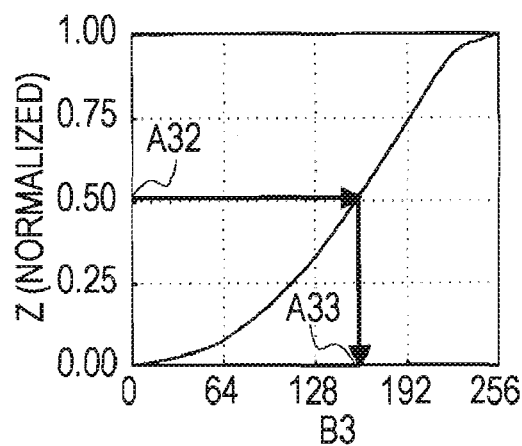
Figure 13C:
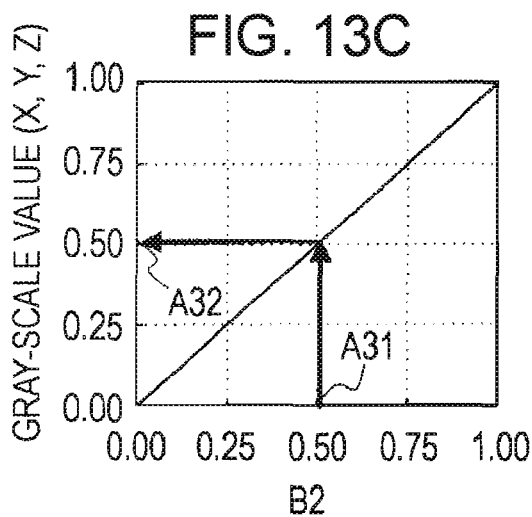

FIGS. 13A to 13D are graphs illustrating a method for determining an output 1DLUT for blue. FIG. 13A is a graph showing tristimulus values X, Y, and Z (on the horizontal axis) for tone characteristics values (on the horizontal axis) of image data item B3 representing red, the tristimulus values being obtained by measurement or the like. FIG. 13A indicates that, regarding image data item R3, among tristimulus values X, Y, and Z, value Z is greater than the other tristimulus values. Therefore, regarding image data item B3, value Z among the tristimulus values X, Y, and Z is determined as a greater value.

Figure 13D:
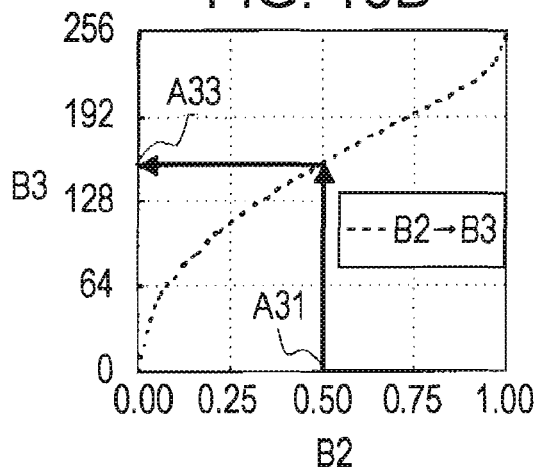

After the tristimulus value that is greater than the other tristimulus values is determined as described above, in the above-described process, normalization (see FIG. 13B) of the determined Z and acquisition (see FIG. 13C) of a linear characteristic are performed. By reading, in the linear characteristic shown in FIG. 13C, a value on the vertical axis on the basis of a value on the horizontal axis, and associating the read value with a value on the vertical axis of the normalized Z shown in FIG. 13B, a value on the horizontal axis is read. Specifically, from tone characteristics value A31 of image data item B2, tone characteristics value A32 of Z is obtained, and, from tone characteristics value A32 of Z, tone characteristics value A33 of image data item B3 is obtained. As shown in FIG. 13D, this determines an output 1DLUT for image data item B2 in the output-1DLUT conversion unit 123b.

Figure 14A:
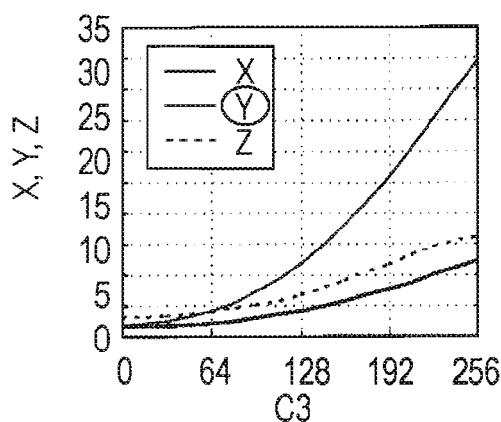
FIGS. 14A to 14D are graphs illustrating a method for determining an output 1DLUT for cyan.
Figure 14B:
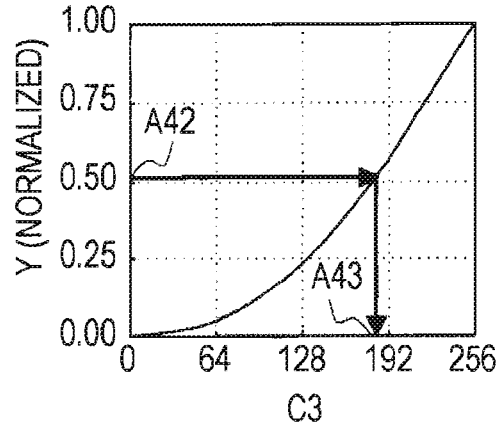
Figure 14C:
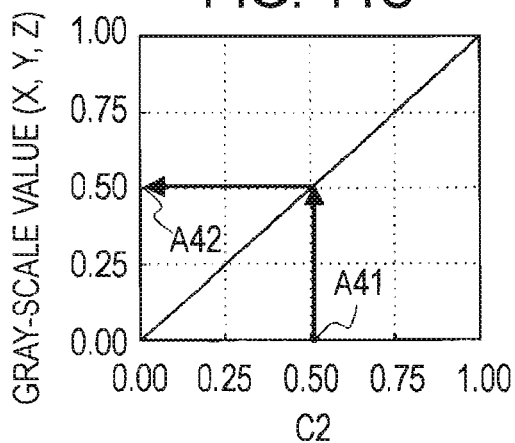
Figure 14D:
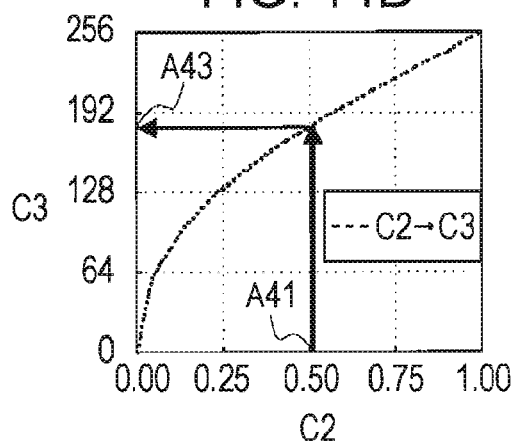

FIGS. 14A to 14D are graphs illustrating a method for determining an output 1DLUT for cyan. FIG. 14A is a graph showing tristimulus values X, Y, and Z (on the vertical axis) for tone characteristics values (on the horizontal axis) of image data item C3 representing cyan, the tristimulus values being obtained by measurement or the like. FIG. 14B indicates that, regarding image data item C3, among tristimulus values X, Y, and Z, value Y is greater than the other tristimulus values. Therefore, regarding image data item C3, value Y among the tristimulus values X, Y, and Z is determined as a greater value.

After the tristimulus value that is greater than the other tristimulus values is determined as described above, in the above-described process, normalization (see FIG. 14B) of the determined Y and acquisition (see FIG. 14C) of a linear characteristic are performed. By reading, in the linear characteristic shown in FIG. 14C, a value on the vertical axis on the basis of a value on the horizontal axis, and associating the read value with a value on the vertical axis of the normalized Y shown in FIG. 14B, a value on the horizontal axis is read. Specifically, from tone characteristics value A41 of image data item C2, tone characteristics value A42 of Y is obtained, and, from tone characteristics value A42 of Y, tone characteristics value A43 of image data item C3 is obtained. As described in FIG. 14D, this determines an output 1DLUT for image data item C2 in the output-1DLUT conversion unit 123c.

Figure 15:
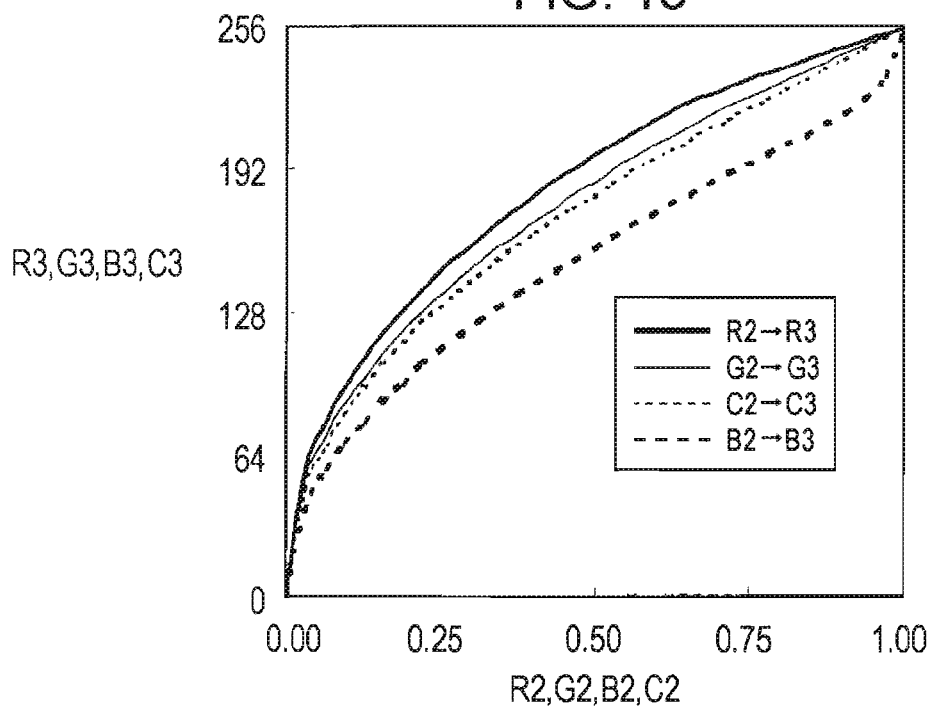
FIG. 15 is a graph simultaneously showing all output 1DLUTs for four primary colors.

FIG. 15 is a graph simultaneously showing all output 1DLUTs for four primary colors. Referring to FIG. 15, the horizontal axis represents image data items R2, G2, B2, and C2 input to the output-1DLUT conversion units 123r to 123c, and the vertical axis represents image data items R3, G3, B3, and C3 output from the output-1DLUT conversion units 123r to 123c. The output-1DLUT conversion units 123r to 123c perform the output-1DLUT conversion on image data items R2, G2, B2, and C2 by using output 1DLUTs corresponding to image data items R2, G2, B2, and C2.

Figure 16:
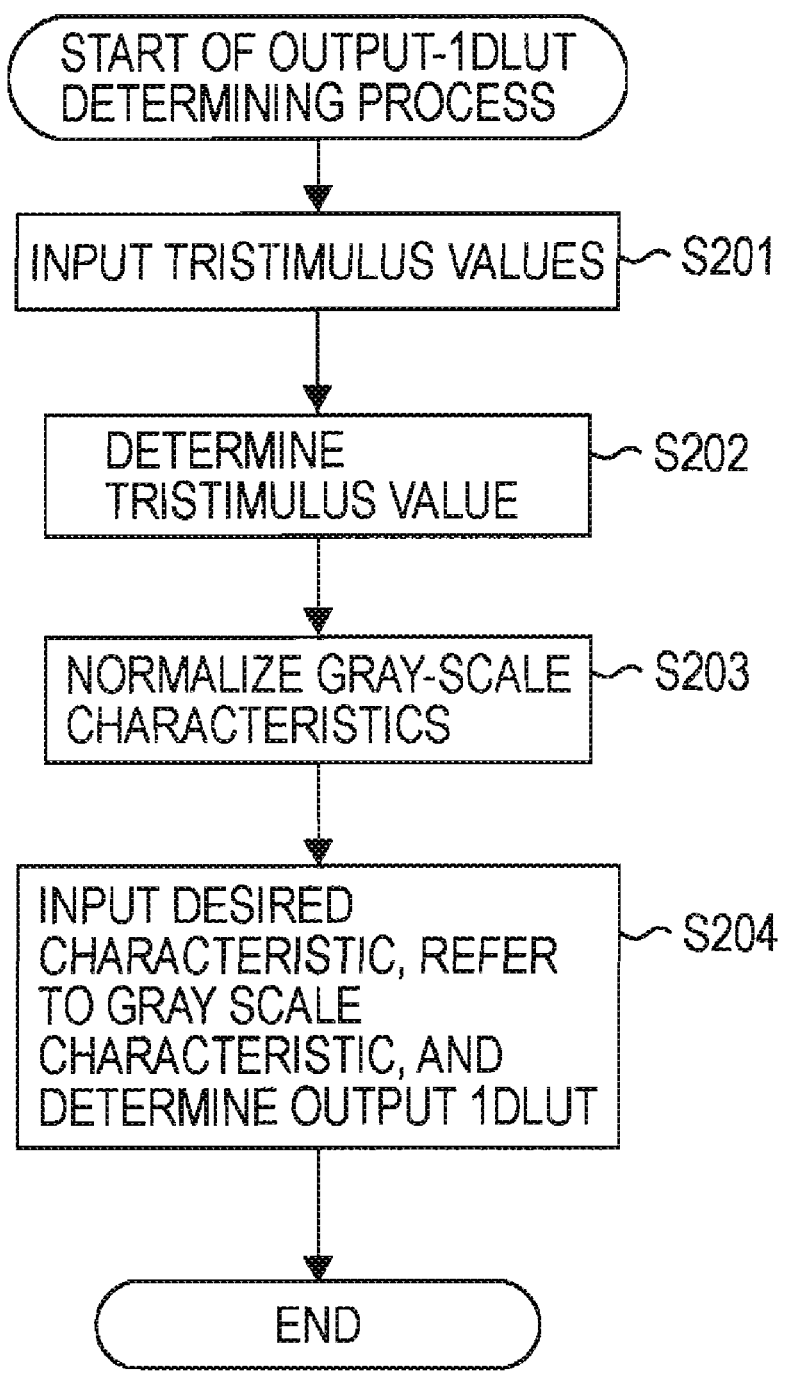
FIG. 16 is a flowchart showing an output-1DLUT determining process according to the first embodiment.

FIG. 16 is a flowchart showing an output-1DLUT determining process according to the first embodiment. This process is executed by the tone-conversion-characteristic determining apparatus 50.

In step S201, tristimulus values X, Y, and Z are input to the tone-conversion-characteristic determining apparatus 50. In other words, the tone-conversion-characteristic determining apparatus 50 acquires tristimulus values X, Y, and Z corresponding to image data items R3, G3, B3, and C3. The process proceeds to step S202. In step S202, the tone-conversioncharacteristic determining apparatus 50 determines, for each of image data items R3, G3, B3, and C3, a tristimulus value that is greater than the other tristimulus values. The process proceeds to step S203.

In step S203, the tone-conversion-characteristic determining apparatus 50 normalizes (performs tone-characteristic normalization on) each determined tone characteristics value among tristimulus values X, Y, and Z. Proceeding to step S204, desired characteristics are input to the tone-conversion-characteristic determining apparatus 50. Specifically, linear characteristics are input to the tone-conversion-characteristic determining apparatus 50. The tone-conversion-characteristic determining apparatus 50 determines output 1DLUTs by referring to the tone characteristics values normalized in step S204. After that, the process finishes.

Next, the output-1DLUT determining method in the first embodiment is compared with different methods. Specifically, with a method according to the first embodiment for selecting X, Y, Z, and Y for R, G, B, and C, a method (hereinafter referred to as "different method 1") for selecting X, Y, Z, and Z for R, G, B, and C, and a method (hereinafter referred to as "different method 2") for selecting Y, Y, Y, and Y for R, G, B, and C are compared. In other words, different method 1 differs from the method according to the first embodiment in that, for C, it uses Z instead of Y. Also, different method 2 differs from the method according to the first embodiment in that, for B, it uses Y instead of Z.

Figure 17A:
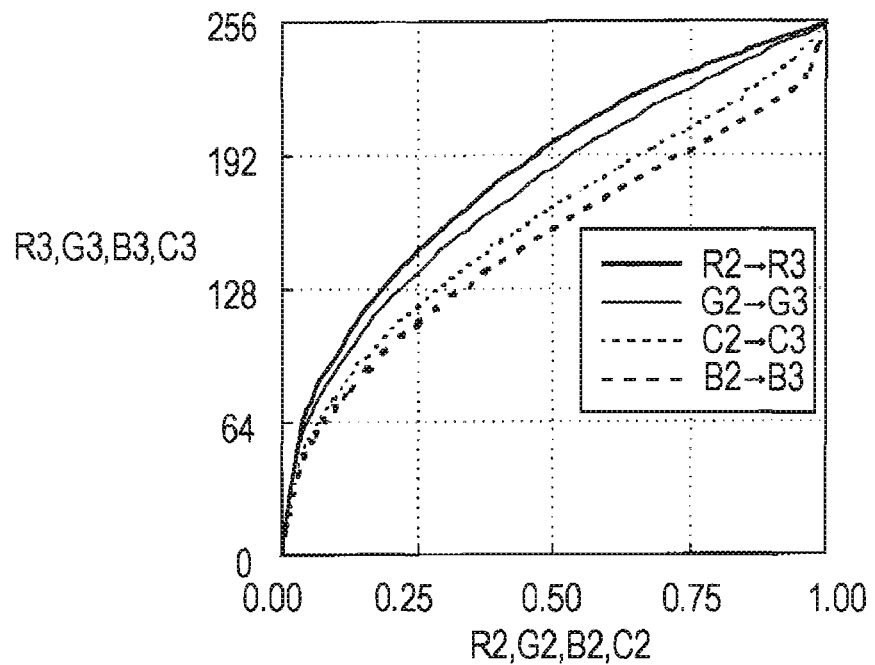
FIGS. 17A and 17B are graphs of output 1DLUTs obtained by different methods 1 and 2.
Figure 17B:
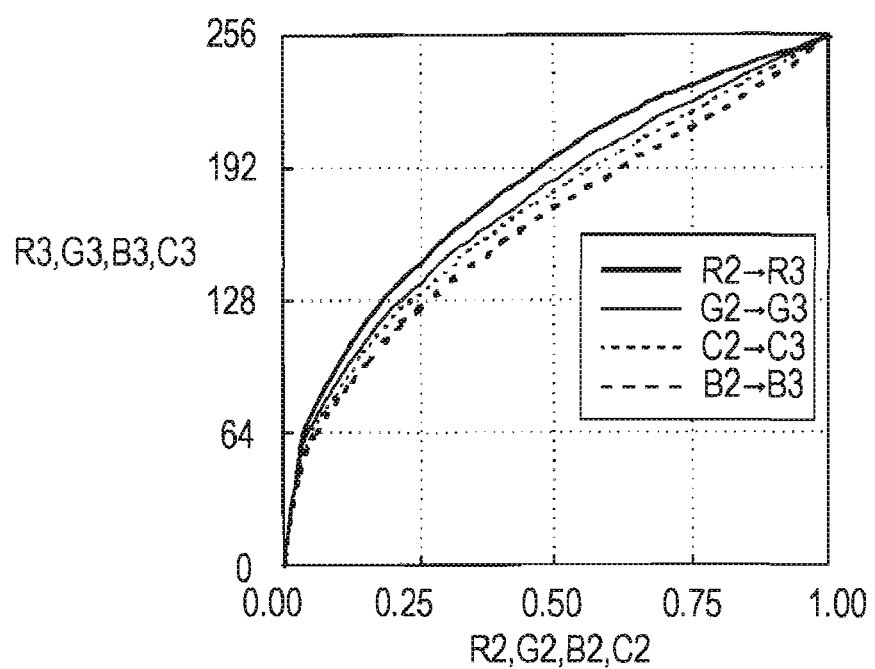

FIGS. 17A and 17B are graphs of output 1DLUTs obtained by different methods 1 and 2. Specifically, FIG. 17A shows an output 1DLUT obtained by different method 1, and FIG. 17B shows an output 1DLUT obtained by different method 2. In each of FIGS. 17A and 17B, similarly to FIG. 15, the horizontal axis represents image data items R2, G2, B2, and C2, and the vertical axis represents image data items R3, G3, B3, and C3.

Different methods 1 and 2 are compared with the method according to the first embodiment in the following process. First, by using the output 1DLUT obtained by each method, image data items R2, G2, B2, and C2 are converted into image data items R3, G3, B3, and C3, and X, Y, and Z of each of image data items R3, G3, B3, and C3 are obtained as measurement values. X, Y, and Z of white are calculated as additive color mixture values, and a luminance (hereinafter referred to as "luminance L*") and a chroma (hereinafter referred to as "chroma C*") are calculated. Since desired characteristics are set as linear characteristics, it is ideal that the characteristics of R3, G3, B3, and C3 are linear and it is ideal that the characteristic of white as an additive color mixture is also linear. In this case, if white is linear in characteristic, When no coloring occurs, chroma C* is "0". Therefore, by plotting measurement values on a graph having chroma C* on the horizontal axis and luminance L* on the vertical axis, and comparing the magnitudes of chromas C* at luminance L*, the above methods can be compared. In this case, a less chroma C* is closer to an ideal value.

Figure 18:
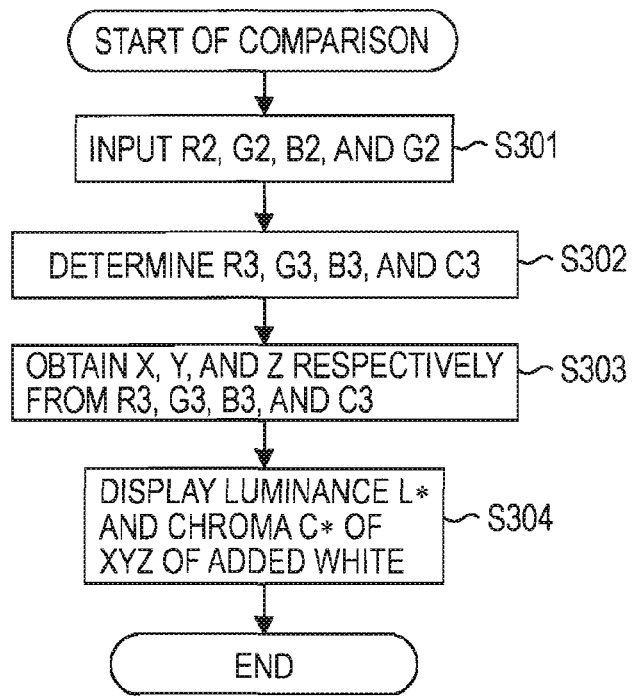
FIG. 18 is a flowchart showing a method for comparing the method according to the first embodiment and the different methods.

FIG. 18 is a flowchart showing a method for comparing the above methods. First, in step S301, image data items R2, G2, B2, and C2 are input. In step S302, after image data items R2, G2, B2, and C2 are converted by output 1DLUTs, image data items R3, G3, B3, and C3 are output. In step S303, from each of image data items R3, G3, B3, and C3, X, Y, and Z are obtained as measurement values, and the process proceeds to step S304. In step S304, X, Y, and Z of white are calculated as additive color mixture values, and luminance L* and chroma C* are calculated and displayed. After that, the process finishes.

Figure 19:
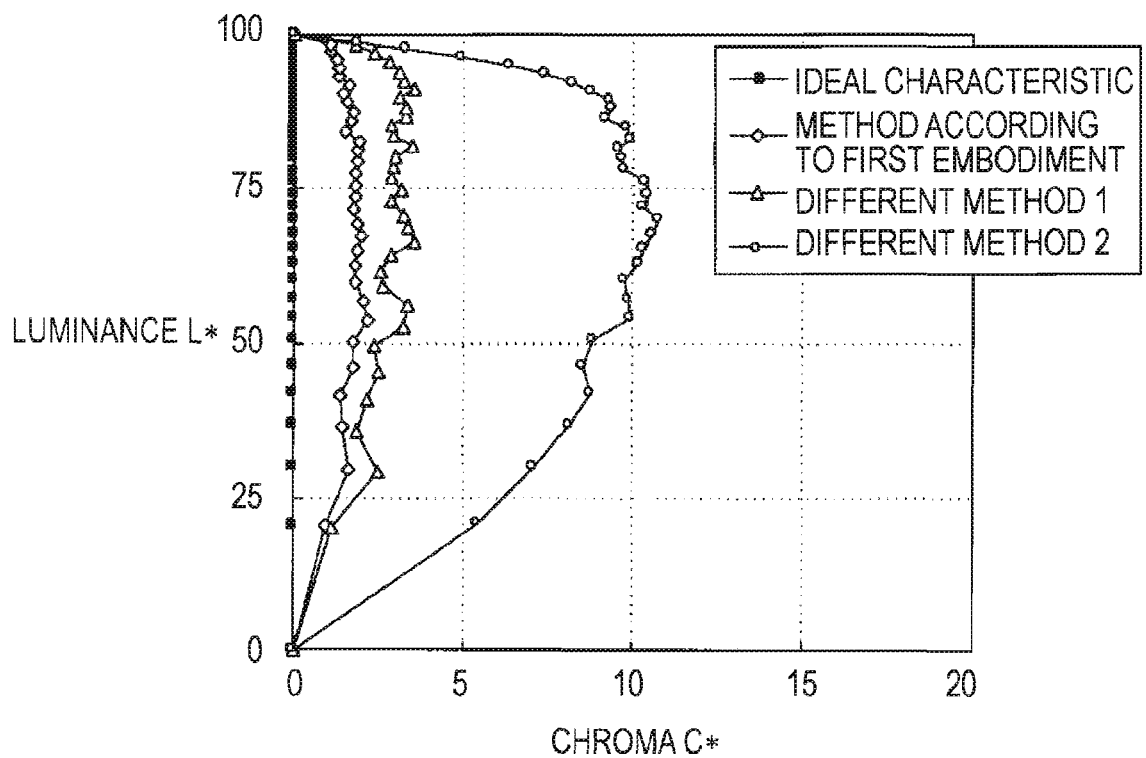
FIG. 19 is a graph showing results of comparison between the method according to the first embodiment and the different methods.

FIG. 19 shows results obtained by executing the process shown in FIG. 18. FIG. 19 indicates that, compared with different methods 1 and 2, in the method according to the first embodiment, the value of chroma C* corresponding to luminance L* is small and close to an ideal value. Therefore, in the case of setting linear characteristics as desired characteristics, according to the method according to the first embodiment, compared with different methods 1 and 2, output-1DLUT conversion that is close to linear characteristics can be performed.

As described above, according to the output-1DLUT determining method in the first embodiment, in display of RGBC multiprimary colors, output 1DLUTs for use in converting tone characteristics can be accurately set. Also, in the first embodiment, among tristimulus values X, Y, and Z of each input primary color, the greatest value is selected. Thus, in simplified processing, output 1DLUTs can be determined.

The invention is not limited to its application to the display panel 23 (see FIG. 1) having a configuration in which pixels are arranged from the left in order of R, G, B, and C. The invention is applicable to even a display panel having a configuration in which R, G, B, and C are arranged in other order.

Although a case in which a linear characteristic having a slope of "1" is used has been described, the invention is applicable to even a case in which a linear characteristic having a different slope is used.

Second Embodiment

Next, a second embodiment of the invention is described below with reference to FIGS. 20 to 22D. The second embodiment differs from the first embodiment in configuration of multiprimary colors. Specifically, the second embodiment differs from the first embodiment in it uses yellow (hereinafter referred to also as "Ye") instead of cyan.

Figure 20:
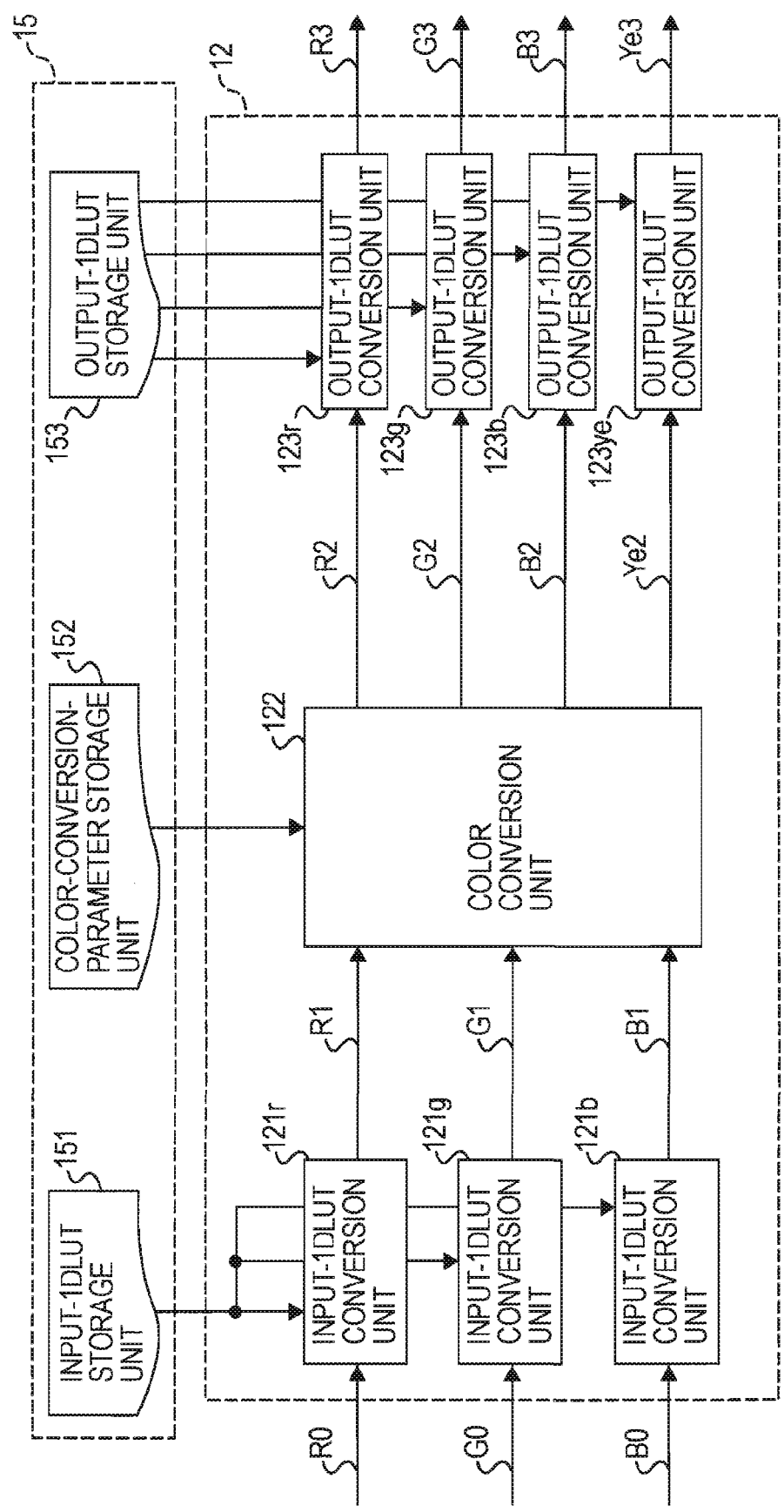
FIG. 20 is a block diagram showing a color conversion circuit and table storage memory according to a second embodiment.

FIG. 20 is a block diagram showing a color conversion circuit 12a and table storage memory 15a according to the second embodiment. The color conversion circuit 12a differs from the color conversion circuit 12 in that it includes a color conversion unit 122a instead of the color conversion unit 122, and an output-1DLUT conversion unit 123ye instead of the output-1DLUT conversion unit 123c. The table storage memory 15a differs from the table storage memory 15 in that it includes a color-conversion-parameter storage unit 152a instead of the color-conversion-parameter storage unit 152, and an output-1DLUT storage unit 153a instead of the output-1DLUT storage unit 153. Accordingly, by denoting identical components with identical reference numerals, their descriptions are omitted. An image display apparatus that includes the color conversion circuit 12a and table storage memory 15a according to the second embodiment can display images by using primary colors of R, G, B, and Ye.

By using color conversion parameters stored in the color-conversion-parameter storage unit 152a, the color conversion unit 122a performs color conversion on supplied image data items R1, G1, and B1 from three primary colors to four primary colors. Specifically, the color conversion unit 122a converts three primary colors, R, G, and B, into four primary colors, R, G, B, and Ye, which are obtained by adding yellow to the three primary colors. The color conversion unit 122a supplies image data items R2, G2, B2, and Ye2 obtained by color conversion to output-1DLUT conversion units 123r to 123ye.

The output-1DLUT conversion units 123r to 123ye use output-1DLUTs stored in the output-1DLUT storage unit 153a to perform output-1DLUT conversion on image data items R2, G2, B2, and Ye2. The output-1DLUT conversion units 123r to 123ye output image data items R3, G3, B3, and Ye3 obtained by the output-1DLUT conversion to the VRAM 13. In such a manner, the output-1DLUT conversion units 123r to 123ye function as an image processor.

Figure 21A:
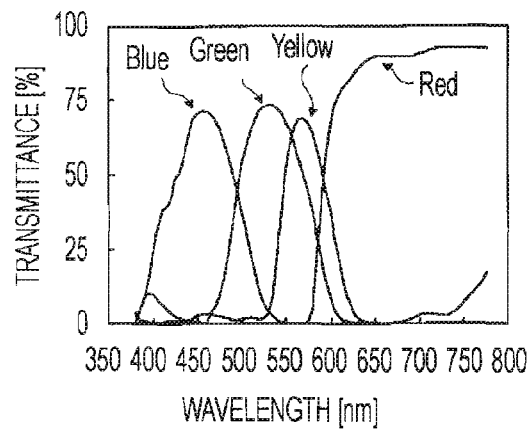
FIGS. 21A to 21D are graphs showing examples of display characteristics of an image display apparatus according to the second embodiment.
Figure 21B:
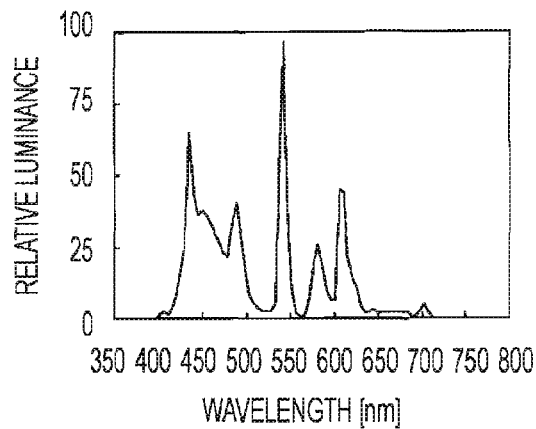
Figure 21C:
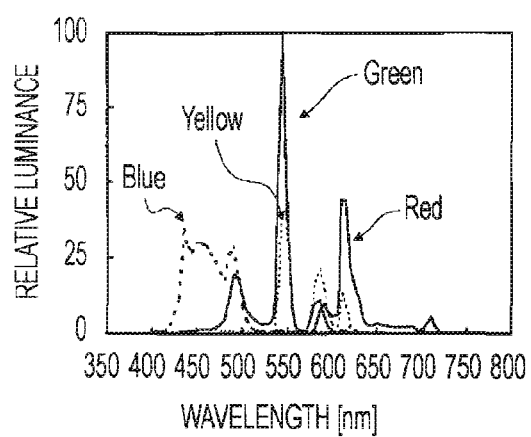
Figure 21D:
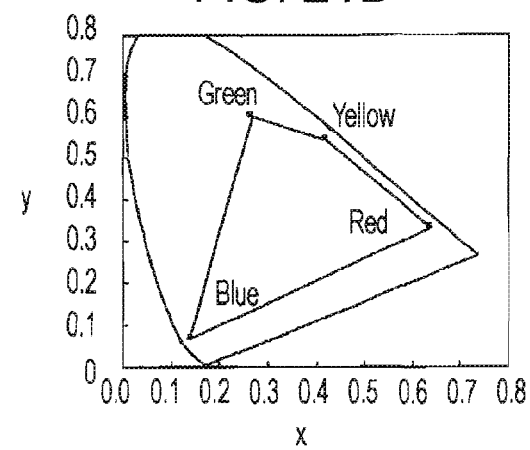

FIGS. 21A to 21D are graphs showing examples of display characteristics of an image display apparatus according to the second embodiment. FIG. 21A is a graph showing spectral characteristics of color filters. The horizontal axis represents a wavelength (nm), and the vertical axis represents a transmittance (%). FIG. 21B is a graph of luminous characteristics of a backlight. The horizontal axis represents a wavelength (nm), and the vertical axis represents a relative luminance (%). FIG. 21C is a graph of luminous characteristics of four primary colors, R, G, B, and Ye. The horizontal axis represents a wavelength (nm), and the vertical axis represents a relative luminance (%) FIG. 21D is a graph formed by calculating color-representing tristimulus values for luminous characteristics of four primary colors and plotting the values on an xy chromaticity diagram. The quadrangle shown in FIG. 21D corresponds to a color reproduction region, vertices of the quadrangle correspond to primary colors of R, G, B, and Ye.

Next, a method for determining output 1DLUTs for R, G, B, and Ye is described below. For R, G, and B, by performing a method similar to that in the first embodiment, from X, Y, and Z of each color, a tristimulus value that is greater than the other tristimulus values is determined, and, on the basis thereof, each output 1DLUTs is determined. Accordingly, a method for determining an output 1DLUT for Ye is only described without describing the method for determining output 1DLUTs for R, G, and B. The method for determining the output 1DLUT for Ye can be performed by the tone-conversion-characteristic determining apparatus 50. In this case, the tone-conversion-characteristic determining apparatus 50 acquires tristimulus values X, Y, and Z corresponding to each of image data items R3, G3, B3, and Ye3, and determines output 1DLUTs for the image data items.

Figure 22A:
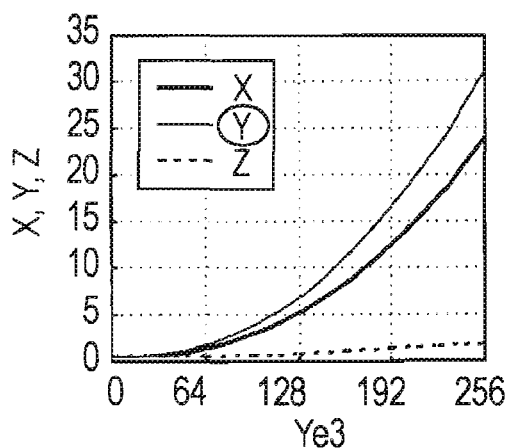
FIGS. 22A to 22D are graphs illustrating the method for determining an output 1DLUT for yellow.
Figure 22B:
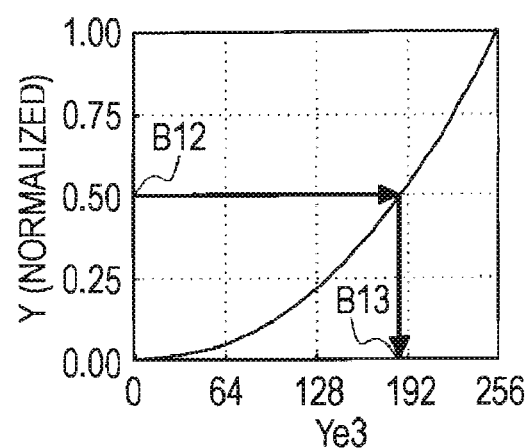
Figure 22C:
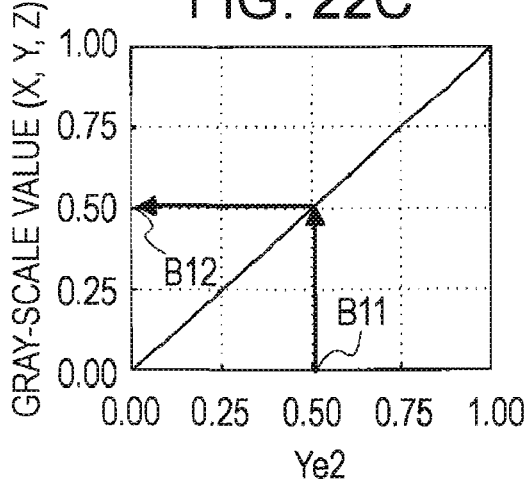

FIGS. 22A to 22D are graphs illustrating the method for determining the output 1DLUT for Ye. FIG. 22A is a graph showing tristimulus values X, Y, and Z (on the vertical axis) for tone characteristics values (on the horizontal axis) of image data item Ye3 representing yellow, the tristimulus values being obtained by measurement or the like. FIG. 22A indicates that, regarding image data item Ye3, among tristimulus values X, Y, and Z, value Y is greater than the other tristimulus values. Therefore, regarding image data item Ye3, value Y among tristimulus values X, Y, and Z is determined as a greater value.

Figure 22D:
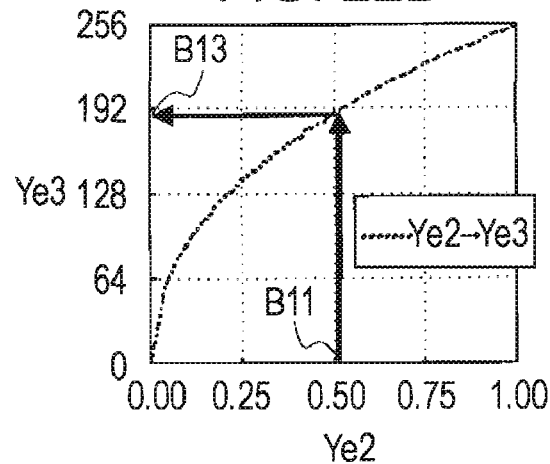

After the greater value among the tristimulus values X, Y, and Z is determined as described above, normalization (see FIG. 22B) of the determined Y and acquisition (see FIG. 22C) of a linear characteristic are performed in a process similar to the above process. By reading, in the linear characteristic shown in FIG. 22C, a value on the vertical axis on the basis of a value on the horizontal axis, and associating the read value with a value on the vertical axis of the normalized Y shown in FIG. 22B, a value on the horizontal axis is read. Specifically, tone characteristics value B12 of Y is obtained from tone characteristics value B11 of image data item Ye2, and tone characteristics value B13 of image data item Ye3 is obtained from tone characteristics value B12 of Y. As shown in FIG. 22D, this determines the relationship between image data item Ye2 input to the output-1DLUT conversion unit 123ye and image data item Ye3 to be output from the output-1DLUT conversion unit 123ye, that is, an output 1DLUT to be used for image data item Ye2 by the output-1DLUT conversion unit 123ye.

As described above, according to the output-1DLUT determining method in the second embodiment, in display of RGBYe multiprimary colors, output 1DLUTs for use in converting tone characteristics can be accurately set. Also in the second embodiment, in simplified processing, output 1DLUTs can be determined.

Third Embodiment

Next, a third embodiment of the invention is described with reference to FIGS. 23 to 25D. The third embodiment differs for the first and second embodiments in that it uses white (hereinafter referred to also as "Wh") instead of cyan and yellow. The color "white" is not a color formed by color filters and corresponds to a transparent color.

Figure 23:
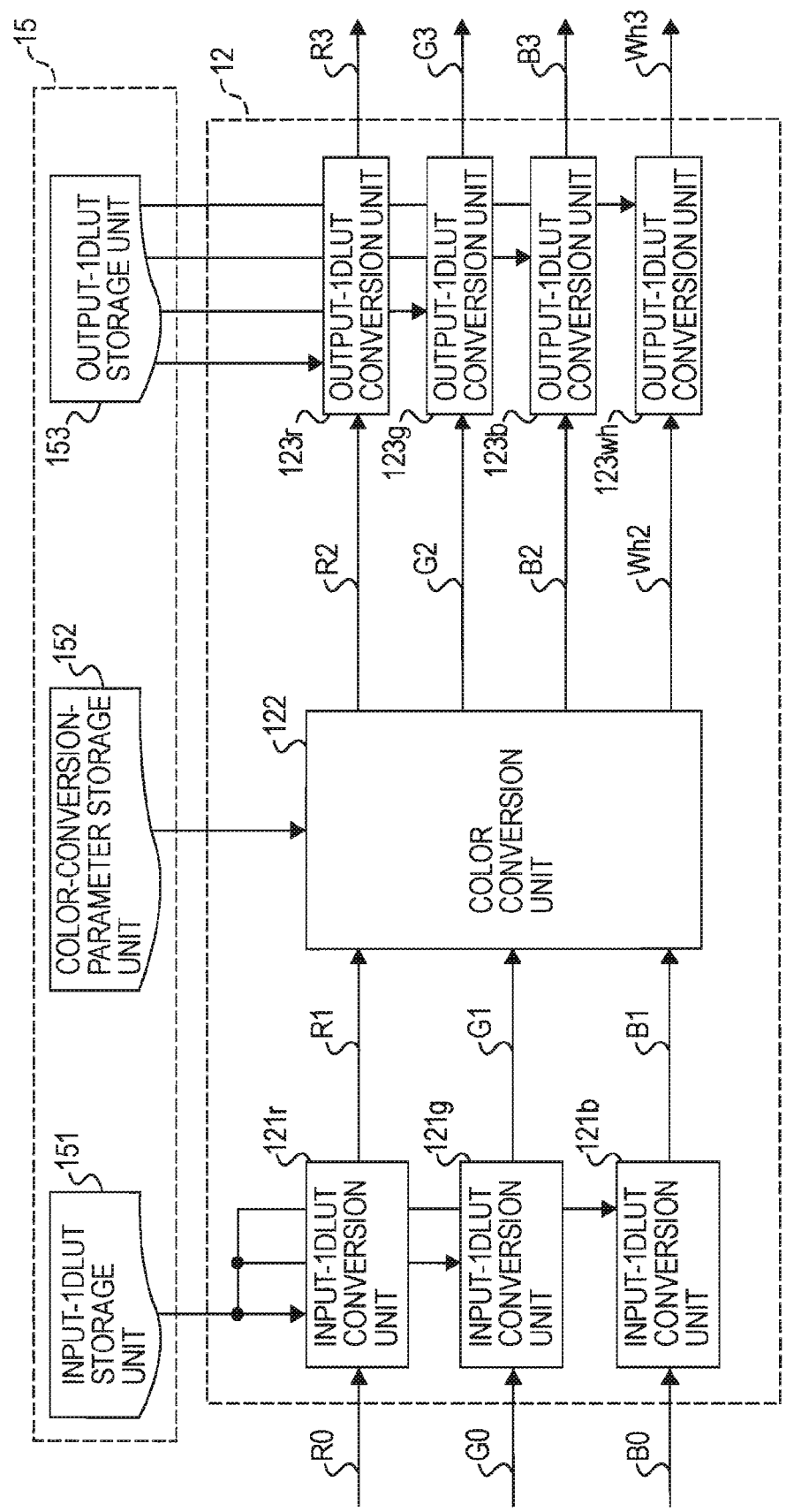
FIG. 23 is a block diagram showing the configurations of a color conversion circuit and table storage memory according to a third embodiment.

FIG. 23 is a block diagram showing the configurations of a color conversion circuit 12b and table storage memory 15b according to the third embodiment. The color conversion circuit 12b differs from the color conversion circuit 12 in the first embodiment in that it includes a color conversion unit 122b instead of the color conversion unit 122, and an output-1DLUT conversion unit 123wh instead of the output-1DLUT conversion unit 123c. Also, the table storage memory 15b differs from the table storage memory 15 in the first embodiment in that it includes a color-conversion-parameter storage unit 152b instead of the color-conversion-parameter storage unit 152, and an output-1DLUT storage unit 153b instead of the output-1DLUT storage unit 153. Accordingly, by denoting identical components with identical reference numerals, their descriptions are omitted. An image display apparatus that includes the color conversion circuit 12b and table storage memory 15b according to the third embodiment can display images by using primary colors, R, G, B, and Wh.

By using color conversion parameters stored in the color-conversion-parameter storage unit 152a, the color conversion unit 122b performs color conversion on supplied image data items R1, C1, and B1 from three primary colors to four primary colors. Specifically, the color conversion unit 122a converts three primary colors, R, C, and B, into four primary colors, R, C, B, and Wh, which are obtained by adding white to the three primary colors. The color conversion unit 122b supplies R2, G2, B2, and Wh2 obtained by color conversion to output-1DLUT conversion units 123r to 123wh.

The output-1DLUT conversion units 123r to 123wh use output 1DLUTs stores in the output-1DLUT storage unit 153b to perform output-1DLUT conversion on image data items R2, G2, B2, and Wh2. The output-1DLUT conversion units 123r to 123wh output image data items R3, G3, B3, and Wh3 obtained by output-1DLUT conversion to the VRAM 13. In such a manner, the output-1DLUT conversion units 123r to 123wh function as an image processor.

Figure 24A:
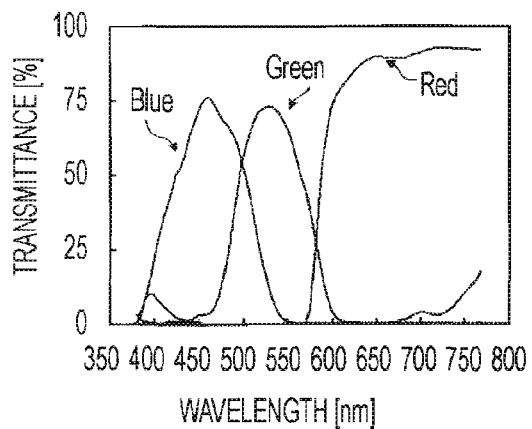
FIGS. 24A to 24D are graphs showing examples of display characteristics of an image display apparatus according to the third embodiment.
Figure 24B:
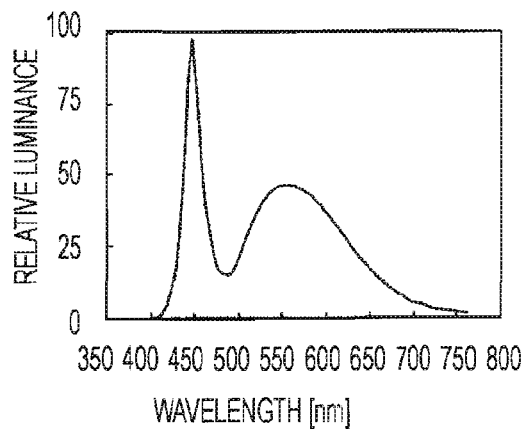
Figure 24C:
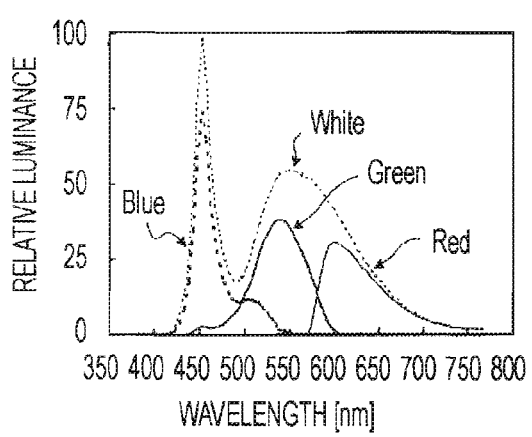
Figure 24D:
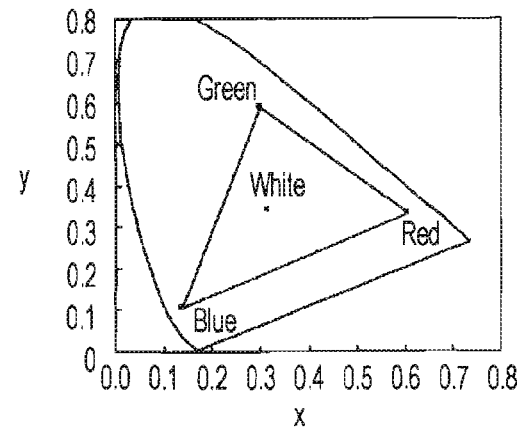

FIGS. 24A to 24D are graphs showing examples of display characteristics of an image display apparatus according to the third embodiment. FIG. 24A is a graph showing spectral characteristics of color filters. The horizontal axis represents a wavelength (nm), and the vertical axis represents a transmittance (%). A color filter corresponding to white is not used. FIG. 24B is a graph of luminous characteristics of a backlight. The horizontal axis represents a wavelength (nm), and the vertical axis represents a relative luminance (%). FIG. 24C is a graph of luminous characteristics of four primary colors, R, G, B, and Ye. The horizontal axis represents a wavelength (nm), and the vertical axis represents a relative luminance (%). In this case, pixels for white are not provided with color filters. Thus, spectral characteristics of white are substantially similar in shape to those of a backlight. FIG. 24D is a graph formed by calculating color-representing tristimulus values for luminous characteristics of four primary colors and plotting the values on an xy chromaticity diagram. As shown in FIG. 24D, the color reproduction region is represented not by a quadrangle but a triangle. The vertices of the triangle correspond to R, G, and B, and Wh is located in the triangle. This color reproduction region is similar to that for three primary colors. However, by adding white to form four primary colors, a transmittance is increased. Accordingly, an advantage can be obtained in that display-unit surface brightness is raised.

Next, a method for determining output 1DLUTs for R, G, B, and Wh is described below. For R, G, and B, by performing a method similar to that in the first embodiment, among X, Y, and Z for each color, one value that is greater than the other value is determined, and, on the basis thereof, each output 1DLUT is determined. Accordingly, a method for determining an output 1DLUT for Wh is only described without describing the method for determining output 1DLUTs for R, G, and B. The method for determining the output 1DLUT for Wh can be performed by the tone-conversion-characteristic determining apparatus 50. In this case, the tone-conversion-characteristic determining apparatus 50 acquires tristimulus values X, Y, and Z corresponding to each of image data items R3, G3, B3, and Wh3, and determines output 1DLUTs for the image data items.

Figure 25A:
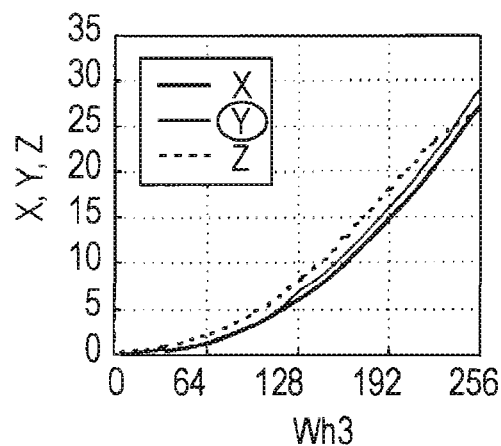
FIGS. 25A to 25D are graphs illustrating a method for determining an output 1DLUT for white.
Figure 25B:
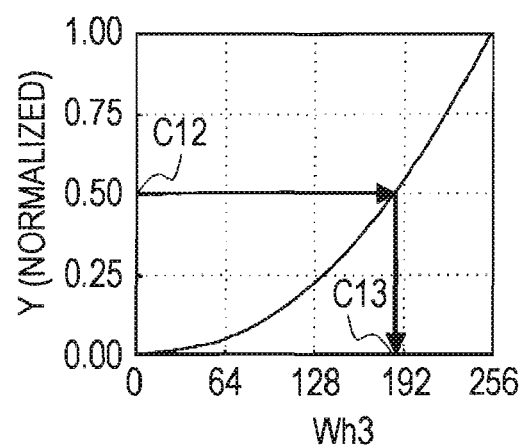
Figure 25C:
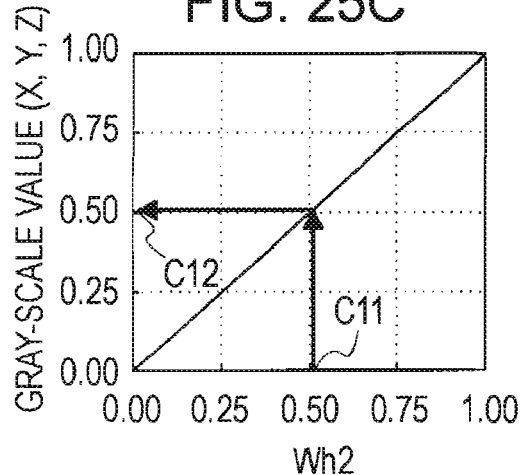

FIGS. 25A to 25d are graphs illustrating the method for determining the output 1DLUT for Wh. FIG. 25A is a graph showing tristimulus values X, Y, and Z (on the vertical axis) for tone characteristics values (on the horizontal axis) of image data item Wh3 representing yellow, the tristimulus values being obtained by measurement or the like. FIG. 25A indicates that, regarding image data item Wh3, tristimulus values X, Y, and Z are close to one another. Therefore, instead of using tristimulus values X, Y, and Z obtained in entire observation, by using tristimulus values X, Y, and Z corresponding to the maximum tone characteristics value (i.e., "255") of the original color, the tone-conversion-characteristic determining apparatus 50 determines a value that is greater than the other values. In this case, when the tone characteristics value is "255", it is indicated that value Y is greater than the other values. Accordingly, regarding image data item Wh3, value Y among the tristimulus values is determined as a greater value.

Figure 25D:
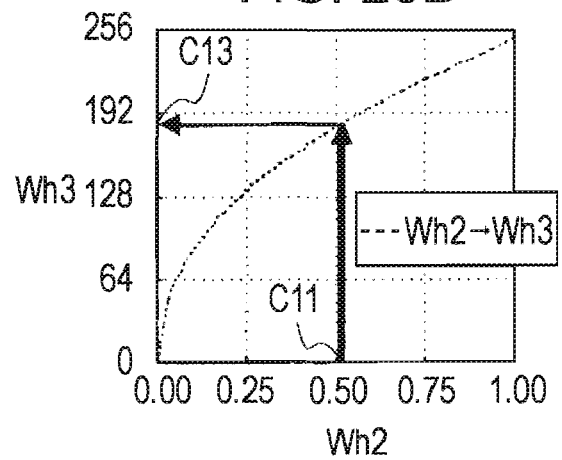

After the greater value among the tristimulus values X, Y, and Z is determined as described above, normalization (see FIG. 25B) of the determined Y and acquisition (see FIG. 25C) of a linear characteristic are performed in a process similar to the above process. By reading, in the linear characteristic shown in FIG. 25C, a value on the vertical axis on the basis of a value on the horizontal axis, and associating the read value with a value on the vertical axis of the normalized Y shown in FIG. 25B, a value on the horizontal axis is read. Specifically, tone characteristics value C12 of Y is obtained from tone characteristics value C11 of image data item Wh2, and tone characteristics value C13 of image data item Wh3 is obtained from tone characteristics value C12 of Y. As shown in FIG. 25D, this determines the relationship between image data item Wh2 input to the output-1DLUT conversion unit 123wh and image data item Wh3 to be output from the output-1DLUT conversion unit 123wh, that is, an output 1DLUT to be used or image data item Wh2 by the output-1DLUT conversion unit 123wh.

As described above, according to the output-1DLUT determining method in the third embodiment, in display of RGBWh multiprimary colors, output 1DLUTs for use in converting tone characteristics can be accurately set. Also in the third embodiment, in simplified processing, output 1DLUTs can be determined.

Fourth Embodiment

Next, a fourth embodiment of the invention is described below. The fourth embodiment differs from the above first to third embodiments in that not only the output-1DLUT conversion but also gamma conversion uses tone-conversion characteristics which are determined on the basis of a greater value among the tristimulus values corresponding to each tone characteristics value of the original color. That is, in the fourth embodiment, by setting a desired characteristic to a gamma characteristic instead of a linear characteristic, tone-conversion characteristics are determined and used to perform gamma correction. Specifically, in the fourth embodiment, a gamma characteristic prescribed on the basis of a gamma value is set as a desired characteristic, whereby a gamma correction table is determined on the basis of a greater value among the tristimulus values. Gamma correction is performed on the basis of the determined gamma correction table. This gamma correction table corresponds to tone-conversion characteristics.

Figure 26:
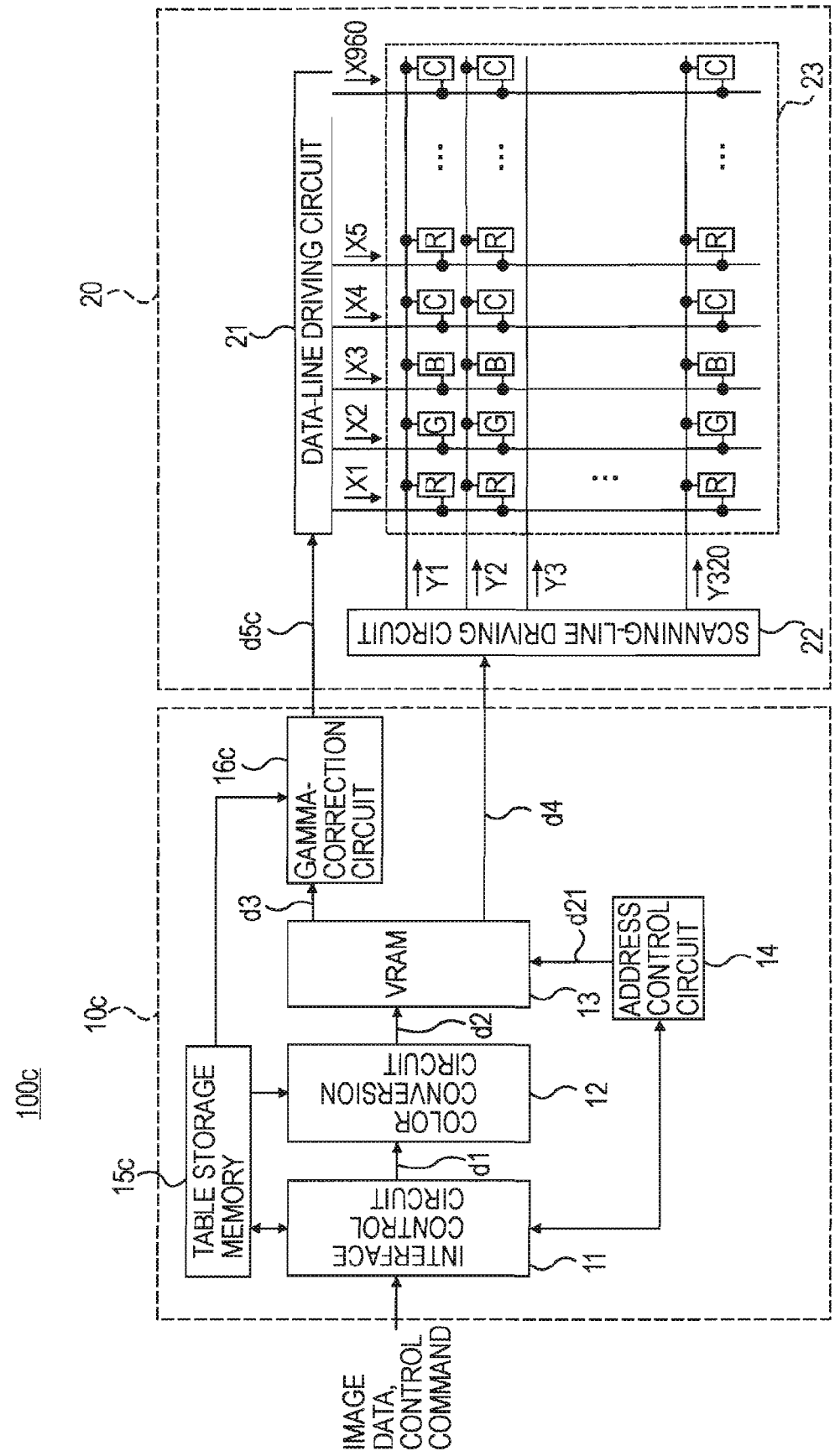
FIG. 26 is a schematic block diagram showing the configuration of an image display apparatus according to a fourth embodiment.

FIG. 26 is a schematic block diagram showing the configuration of an image display apparatus 100c according to the fourth embodiment. The image display apparatus 100c differs from the image display apparatus 100 in the first embodiment in that it includes a table storage memory 15c instead of the table storage memory 15, and a gamma correction circuit 16c instead of the gamma correction circuit 16. Accordingly, by denoting identical components with identical reference numerals, their descriptions are omitted. The image display apparatus 100c is similar to the image display apparatus 100 in the first embodiment in it displays images by using four primary colors of R, G, B, and C. Accordingly, the color conversion circuit 12 converts three primary colors of R, G, and B into four primary colors of R, G, B, and C, and performs output-1DLUT conversion by using output 1DLUTs determined in the above method.

The gamma correction circuit 16c reads image data item d3 (corresponding to the above image data items R3, G3, B3, and C3) from the VRAM 13, and performs gamma correction on the read image data item d3 by referring to a gamma correction table stored in the table storage memory 15c. The gamma correction circuit 16c supplies image data item d5c (hereinafter referred to also as "image data items R4, G4, B4, and C4") obtained by the gamma correction to the data-line driving circuit 21 in the display unit 20. In such a manner, the gamma correction circuit 16c functions as an image processor.

The table storage memory 15c stores a gamma correction table which is determined on the basis of a greater value among tristimulus values corresponding to each of tone characteristics values of R, G, B, and C, and a specified gamma characteristic. This gamma correction table contains data items corresponding to R, G, B, and C.

Next, a method for determining a gamma-correction table for each of R, G, B, and C is described below with reference to FIGS. 27A to 30D. The gamma-correction-table determining method is similar in basic concept to the above output-1DLUT determining method. Specifically, on the basis of tristimulus values X, Y, and Z corresponding to a tone characteristics value of each of multiprimary colors, among tristimulus values X, Y, and Z, a tristimulus value that is greater than the other tristimulus values is determined. On the basis of the determined tristimulus value, a gamma-correction table is determined. Determination of the gamma-correction table can be performed by the above tone-conversion-characteristic determining apparatus 50. In this case, the tone-conversion-characteristic determining apparatus 50 acquires tristimulus values X, Y, and Z corresponding to each of image data items R4, G4, B4, and C4, and determines and outputs, as gamma-correction tables, tone-conversion characteristics for the image data items R4, G4, B4, and C4.

Figure 27A:
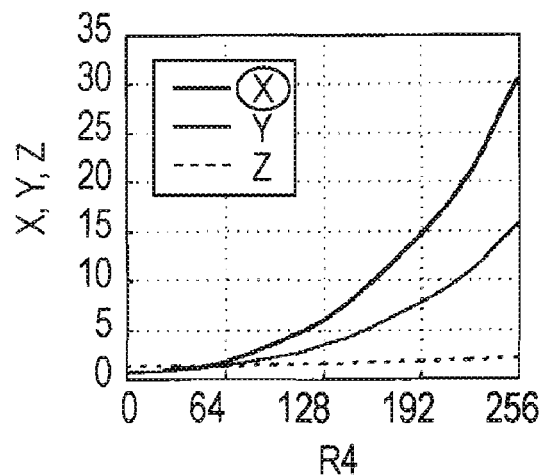
FIGS. 27A to 27D are graphs illustrating a method for determining a gamma-correction table for red.
Figure 27B:
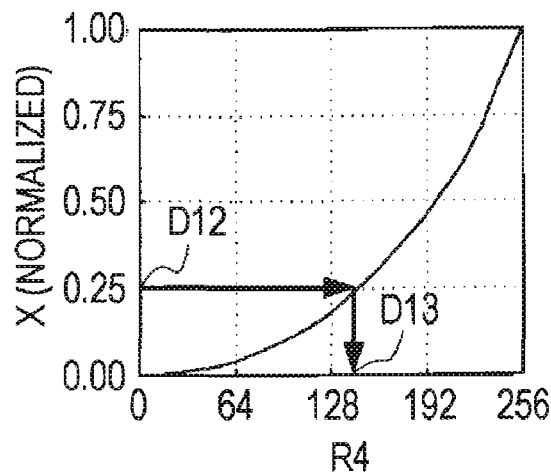

FIGS. 27A to 27D are graphs illustrating a method for determining a gamma-correction table for red. FIG. 27A is a graph showing tristimulus values X, Y, and Z (on the vertical axis) for tone characteristics values (on the horizontal axis) of image data item R4 representing red, the tristimulus values being obtained by measurement or the like. FIG. 27A indicates that, regarding image data item R4, among tristimulus values X, Y, and Z, value X is greater than the other tristimulus values. Therefore, regarding image data item R4, value X among tristimulus values X, Y, and Z is determined as a greater value.

Figure 27C:
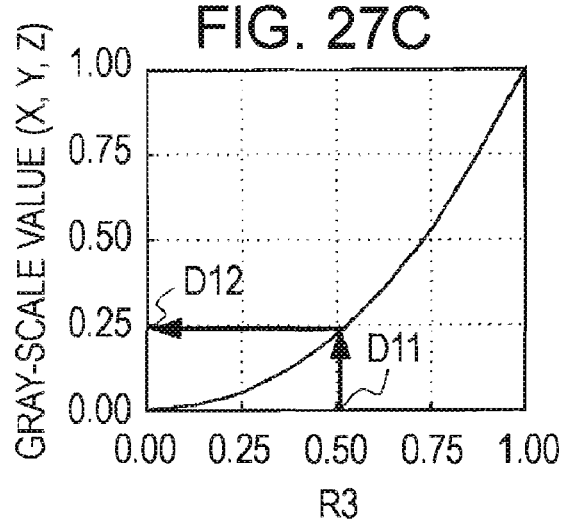
Figure 27D:
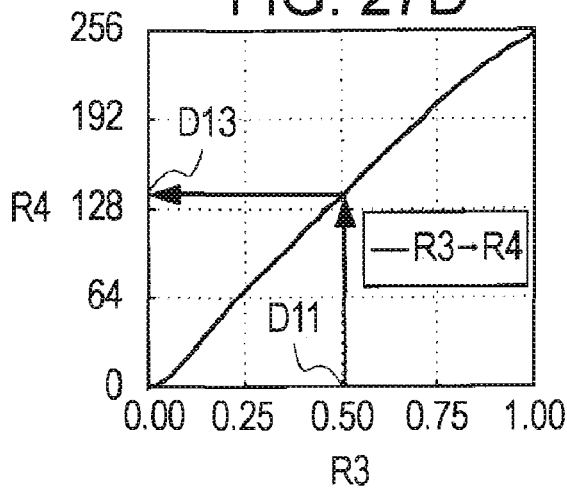

After the tristimulus value that is greater than the other tristimulus values is determined as described above, normalization (see FIG. 27B) of the determined X and acquisition (see FIG. 27C) of a gamma characteristic are performed. In this case, as shown in FIG. 27C, a gamma value in gamma characteristic is specified as "γ=2.2". Next, by reading, in the gamma characteristic shown in FIG. 27C, a value on the vertical axis on the basis of a value on the horizontal axis, and associating the read value with a value on the vertical axis of the normalized X shown in FIG. 27B, a value on the horizontal axis is read. Specifically, from tone characteristics value D11 of image data item R3, tone characteristics value D12 of X is obtained, and, from tone characteristics value D12 of X, tone characteristics value D13 of image data item R4 is obtained. As shown in FIG. 27D, this determines the relationship between image data item R3 input to the gamma correction circuit 16c and image data item R4 to be output from the gamma correction circuit 16c, that is, a gamma-correction table to be used for image data item R3 by the gamma correction circuit 16c.

Figure 28A:
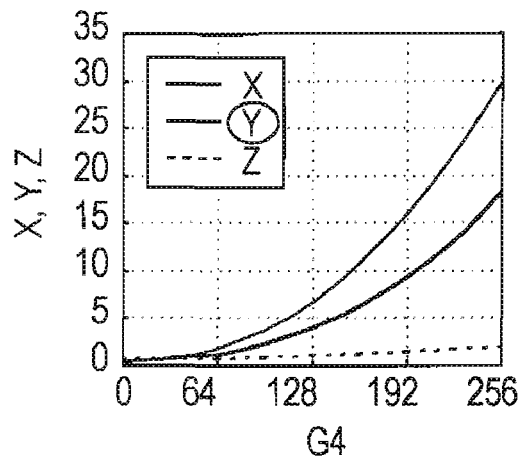
FIGS. 28A to 28D are graphs illustrating a method for determining a gamma-correction table for green.
Figure 28B:
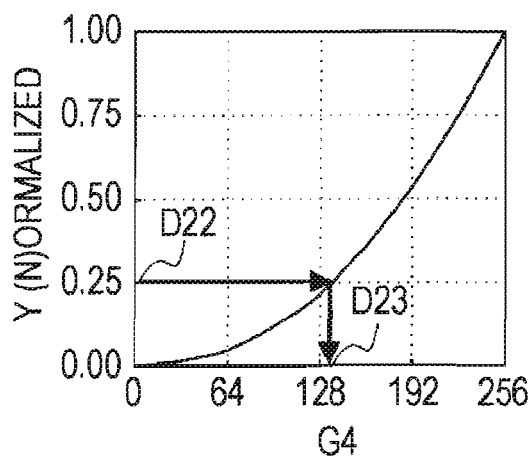
Figure 28C:
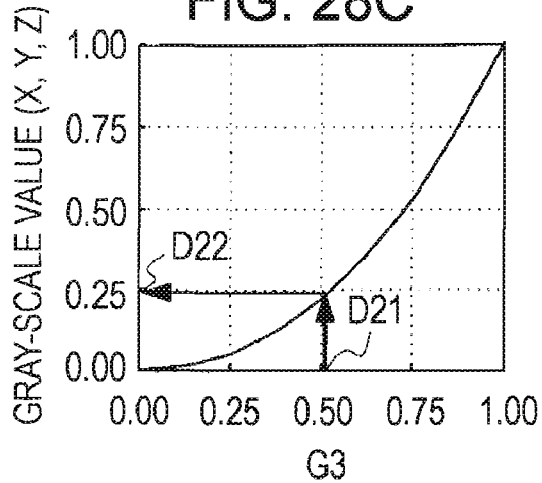

FIGS. 28A to 28D are graphs illustrating a method for determining a gamma-correction table for green. FIG. 28A is a graph showing tristimulus values X, Y, and Z (on the vertical axis) for tone characteristics values (on the horizontal axis) of image data item G4 representing green, the tristimulus values being obtained by measurement or the like. FIG. 28A indicates that, regarding image data item G4, among tristimulus values X, Y, and Z, value Y is greater than the other tristimulus values. Therefore, regarding image data item G4, value Y among tristimulus values X, Y, and Z is determined as a greater value.

Figure 28D:
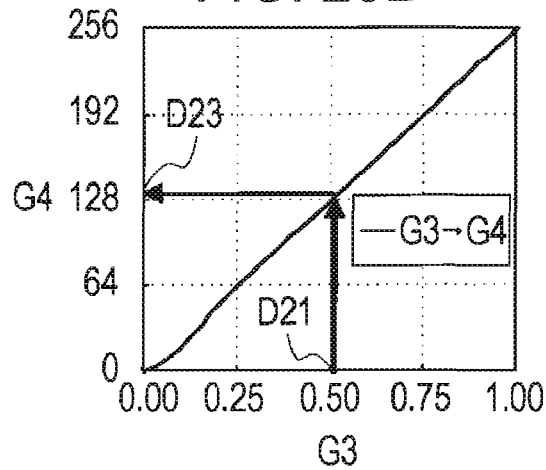

After the tristimulus value that is greater than the other tristimulus values is determined as described above, normalization (see FIG. 28B) of the determined X and acquisition (see FIG. 28C) of a gamma characteristic are performed. Also in this case, a gamma value in gamma characteristic is specified as "γ=2.2". Next, by reading, in the gamma characteristic shown in FIG. 28C, a value on the vertical axis on the basis of a value on the horizontal axis, and associating the read value with a value on the vertical axis of the normalized Y shown in FIG. 28B, a value on the horizontal axis is read. Specifically, from tone characteristics value D21 of image data item G3, tone characteristics value D22 of Y is obtained, and, from tone characteristics value D22 of Y, tone characteristics value D23 of image data item G4 is obtained. As shown in FIG. 28D, this determines a gamma-correction table to be used for image data item G3 by the gamma correction circuit 16c.

Figure 29A:
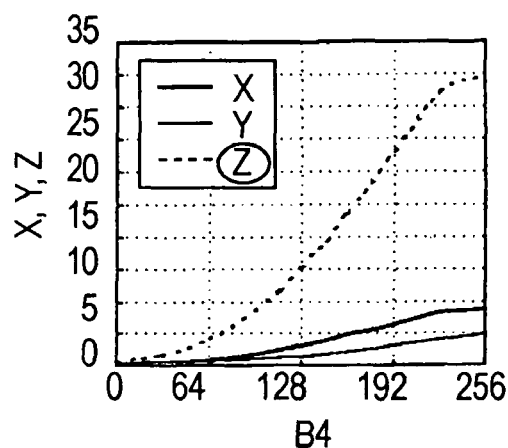
FIGS. 29A to 29D are graphs illustrating a method for determining a gamma-correction table for blue.
Figure 29B:
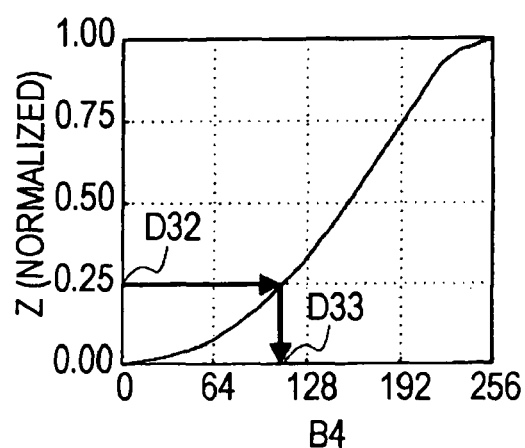
Figure 29C:
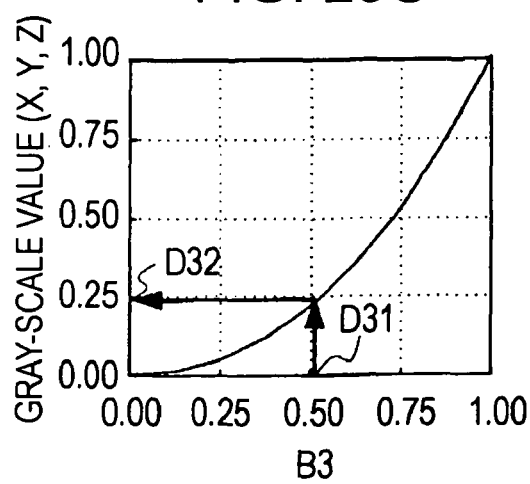

FIGS. 29A to 29D are graphs illustrating a method for determining a gamma-correction table for blue. FIG. 29A is a graph showing tristimulus values X, Y, and Z (on the vertical axis) for tone characteristics values (on the horizontal axis) of image data item B4 representing blue, the tristimulus values being obtained by measurement or the like. FIG. 29A indicates that, regarding image data item R4, among tristimulus values X, Y, and Z, value Z is greater than the other tristimulus values. Therefore, regarding image data item B4, value Z among tristimulus values X, Y, and Z is determined as a greater value.

Figure 29D:
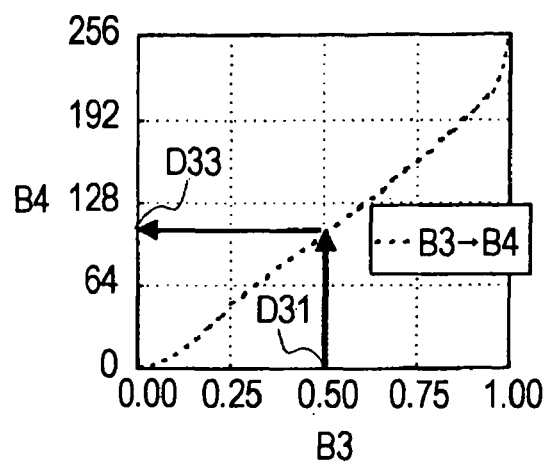

After the tristimulus value that is greater than the other tristimulus values is determined as described above, normalization (see FIG. 29B) of the determined Z and acquisition (see FIG. 29C) of a gamma characteristic are performed. Also in this case, a gamma value in gamma characteristic is specified as "γ=2.2". Next, by reading, in the gamma characteristic shown in FIG. 29C, a value on the vertical axis on the basis of a value on the horizontal axis, and associating the read value with a value on the vertical axis of the normalized Z shown in FIG. 29B, a value on the horizontal axis is read. Specifically, from tone characteristics value D31 of image data item B3, tone characteristics value D32 of Z is obtained, and, from tone characteristics value D32 of Z, tone characteristics value D33 of image data item 54 is obtained. As shown in FIG. 29D, this determines a gamma-correction table to be used for the image data item 33 by the gamma correction circuit 16c.

Figure 30A:
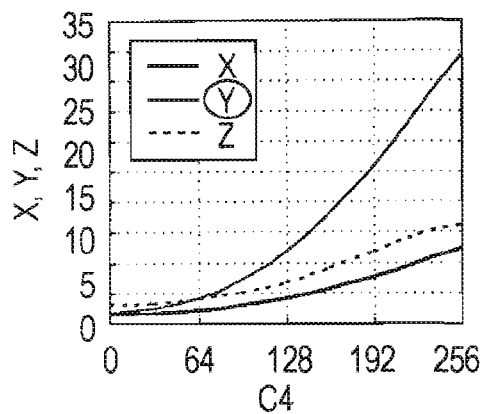
FIGS. 30A to 30D are graphs illustrating a method for determining a gamma-correction table for cyan.
Figure 30B:
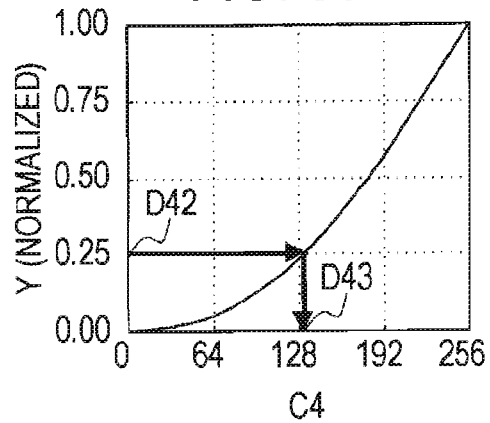
Figure 30C:
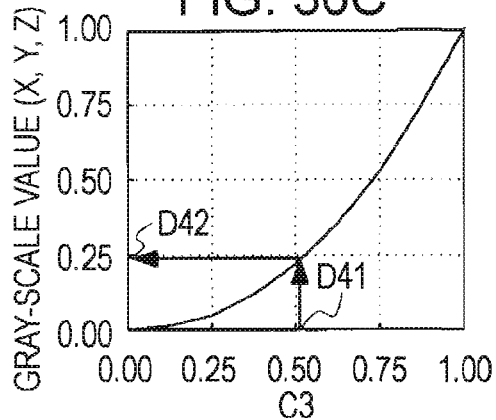

FIGS. 30A to 30D are graphs illustrating a method for determining a gamma-correction table for cyan. FIG. 30A is a graph showing tristimulus values X, Y, and Z (on the vertical axis) for tone characteristics values (on the horizontal axis) of image data item C4 representing cyan, the tristimulus values being obtained by measurement or the like. FIG. 30A indicates that, regarding image data item C4, among tristimulus values X, Y, and Z, value Y is greater than the other tristimulus values. Therefore, regarding image data item C4, value Y among tristimulus values X, Y, and Z is determined as a greater value.

Figure 30D:
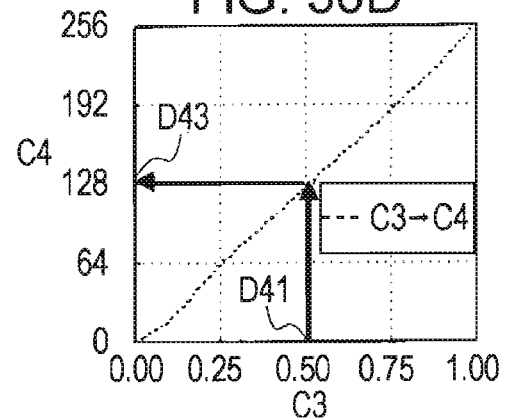

After the tristimulus value that is greater than the other tristimulus values is determined as described above, normalization (see FIG. 30B) of the determined Y and acquisition (see FIG. 30C) of a gamma characteristic are performed. Also in this case, a gamma value in gamma characteristic is specified as "γ=2.2". Next, by reading, in the gamma characteristic shown in FIG. 30C, a value on the vertical axis on the basis of a value on the horizontal axis, and associating the read value with a value on the vertical axis of the normalized Y shown in FIG. 30B, a value on the horizontal axis is read. Specifically, from tone characteristics value D41 of image data item C3, tone characteristics value D42 of Y is obtained, and, from tone characteristics value D42 of Y, tone characteristics value D43 of image data item C4 is obtained. As shown in FIG. 30D, this determines a gamma-correction table to be used for the image data item C3 by the gamma correction circuit 16c.

Figure 31:
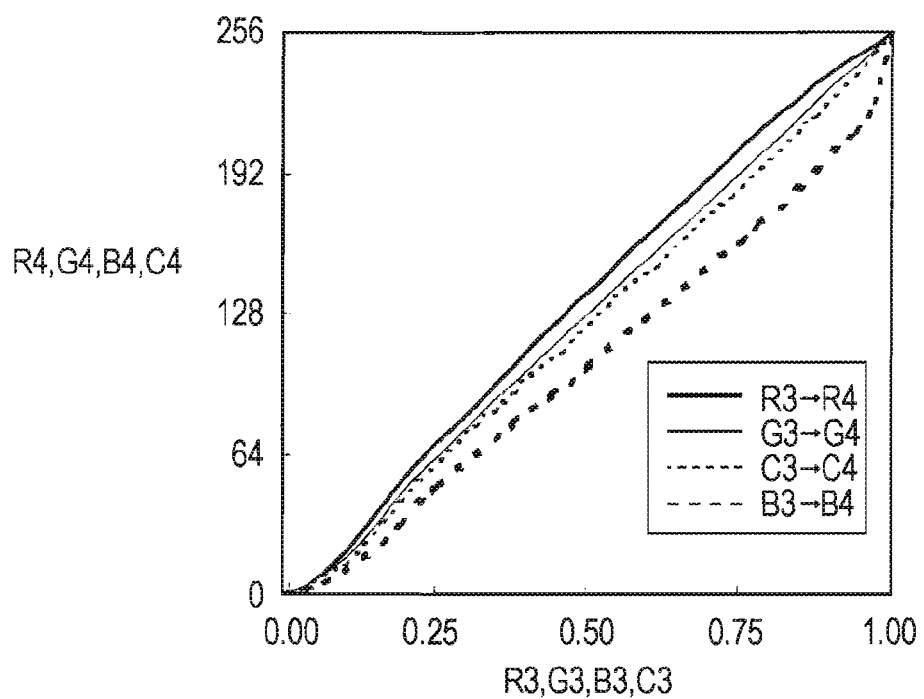
FIG. 31 is a graph simultaneously showing gamma-correction tables for all four primary colors of R, C, B, and C.

FIG. 31 is a graph simultaneously showing the gamma-correction tables determined as described above for all the four primary colors. FIG. 31 shows, on the horizontal axis, image data items R3, G3, B3, and C3 input to the gamma correction circuit 16c, and, on the vertical axis, image data items R4, G4, B4, and C4 output form the gamma correction circuit 16c. The gamma correction circuit 16c performs gamma correction on image data items R3, G3, B3, and C3 by using corresponding gamma-correction tables.

Figure 32:
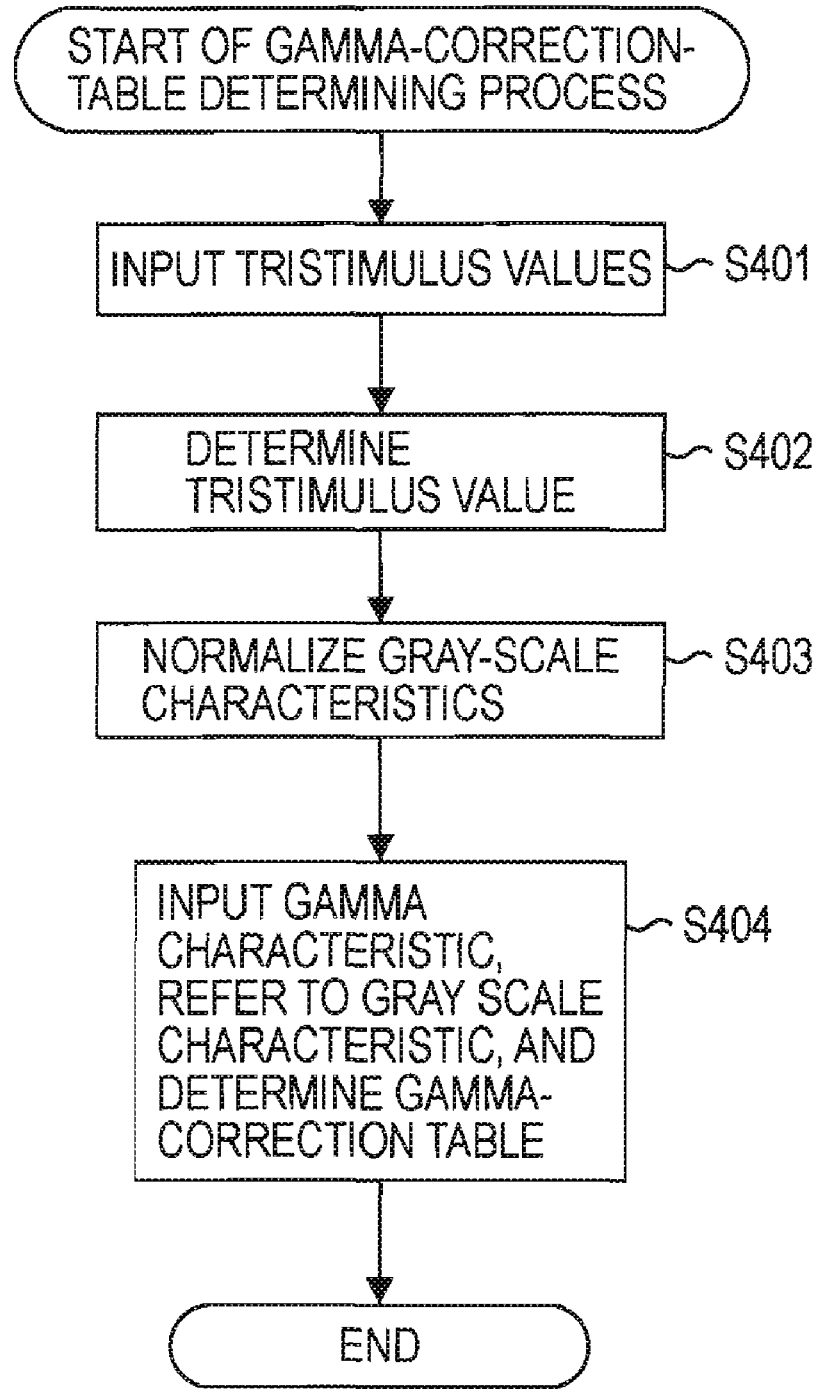
FIG. 32 is a flowchart showing a gamma-correction-table determining process according to a fourth embodiment.

FIG. 32 is a flowchart showing a gamma-correction-table determining process according to the fourth embodiment. This process is executed by the above tone-conversion-characteristic determining apparatus 50.

First, in step S401, tristimulus values X, Y, and Z are input to the tone-conversion-characteristic determining apparatus 50. In other words, the tone-conversion-characteristic determining apparatus 5n acquires tristimulus values X, Y, and Z respectively corresponding to image data items R4, G4, B4, and C4. Proceeding to step S402, for each of image data items R4, G4, B4, and C4, the tone-conversion-characteristic determining apparatus 50 determines, among tristimulus values X, Y, and Z, a tristimulus value that is greater than the other tristimulus values.

In step S403, the tone-conversion-characteristic determining apparatus 50 normalizes (performs tone-characteristic normalization on) the determined tone characteristics value among tristimulus values X, Y, and Z. Proceeding to step S404, desired characteristics are input to the tone-conversion-characteristic determining apparatus 50. Specifically, gamma characteristics are input to the tone-conversion-characteristic determining apparatus 50. The tone-conversion-characteristic determining apparatus 50 determines gamma-correction tables by referring to the tone characteristics values normalized in step S403. After that, the process finishes.

Here, the gamma-correction-table determining method in the fourth embodiment is compared with different methods. Specifically, with the gamma-correction-table determining method according to the first embodiment for selecting X, Y, Z, and Y for R, G, B, and C, a gamma-correction-table determining method (hereinafter referred to as "different method 3") for selecting X, Y, Z, and Z for R, G, B, and C, and a gamma-correction-table determining method (hereinafter referred to as "different method 4") for selecting Y, Y, Y, and Y for R, G, B, and C are compared. In other words, different method 3 differs from the method according to the fourth embodiment in that, for C, it uses Z instead of Y. Also, different method 4 differs form the method according to the fourth embodiment in that, for R, it uses Y instead of R, and, for B, it uses Y instead of Z.

Figure 33A:
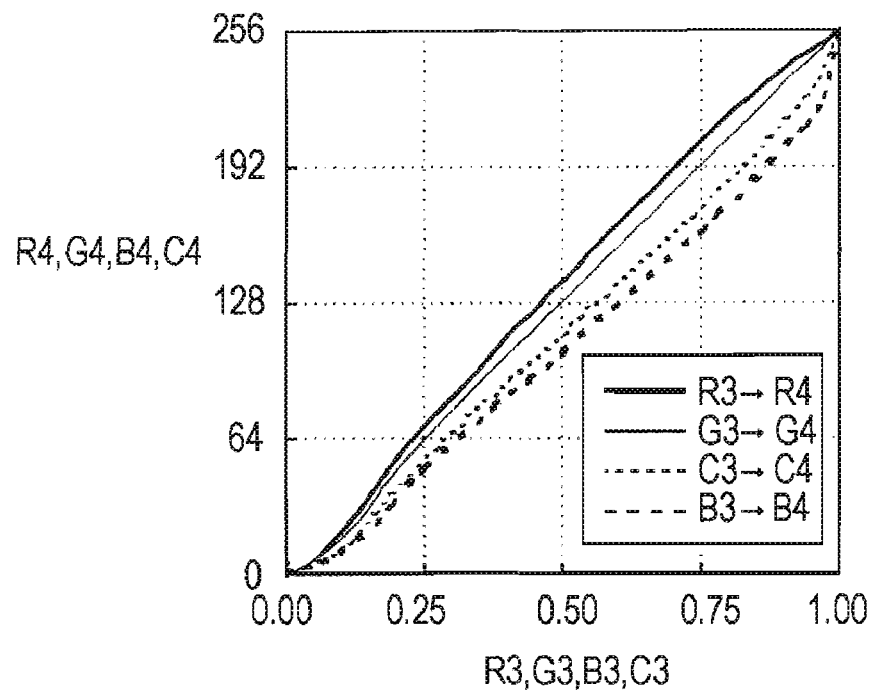
FIGS. 33A and 33b are graphs showing gamma-correction tables obtained by different methods 3 and 4.
Figure 33B:
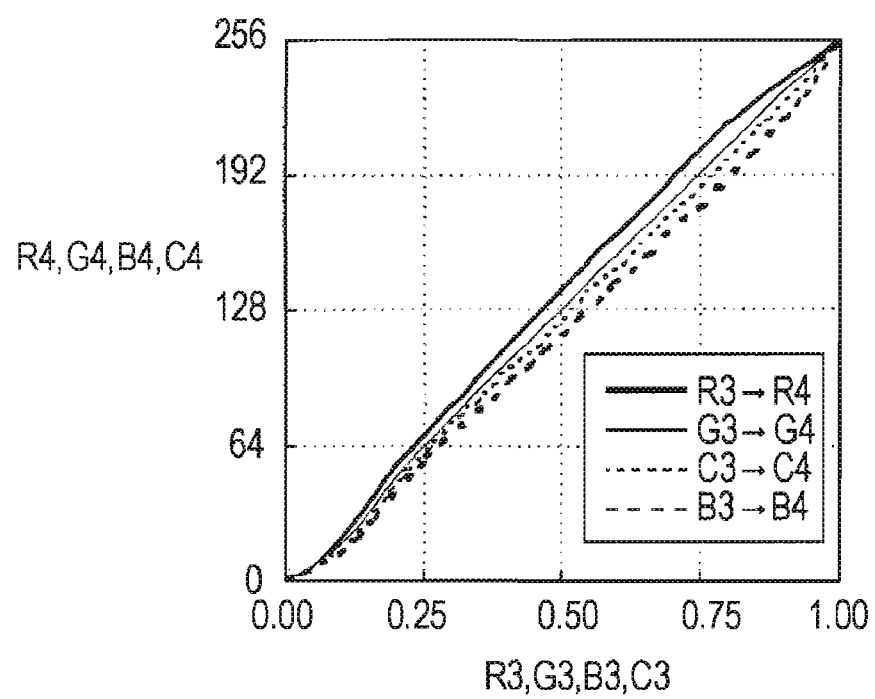

FIGS. 33A and 33b show gamma-correction tables obtained by different methods 3 and 4. Specifically, FIG. 33A shows a gamma-correction table obtained by different method 3, and FIG. 33B shows a gamma-correction table obtained by different method 4. Similarly to FIG. 31, each of FIGS. 33A and 33B shows, on the horizontal axis, image data items R3, G3, B3, and C3, and, on the vertical axis, image data items R4, G4, B4, and C4.

Comparison of the method according to the fourth embodiment with different methods 3 and 4 is performed in the following process. First, by using the gamma-correction tables obtained by the methods, image data items R3, G3, B3, and C3 are converted into R4, G4, B4, and C4, and X, Y, and Z of each of R4, G4, B4, and C4 are obtained as measurement values. X, Y, and Z of white are calculated as additive color mixture values, and luminance L* and chroma C* are calculated. Since the desired characteristic is set as "γ=2.2", it is ideal that characteristics of R4, G4, B4, and C4 are represented as "γ=2.2" and it is ideal that a characteristic of white formed by additive color mixing is also represented as "γ=2.2" In this case, if white is represented as "γ=2.2", X, Y, and Z monotonically increase, so that no coloring occurs. When no coloring occurs, chroma C* is "0". Therefore, by plotting measurement values on a graph having chroma C* on the horizontal axis and luminance L* on the vertical axis, and comparing the magnitudes of chromas C* at luminance L*, the above methods can be compared. In this case, a less chroma C* is closer to an ideal value. When chroma C* and luminance L* are calculated as described above, a graph obtained when a desired characteristic is set to be linear and a graph obtained when a desired characteristic is set to be a gamma characteristic differ from each other in step in monotonic increase.

Figure 34:
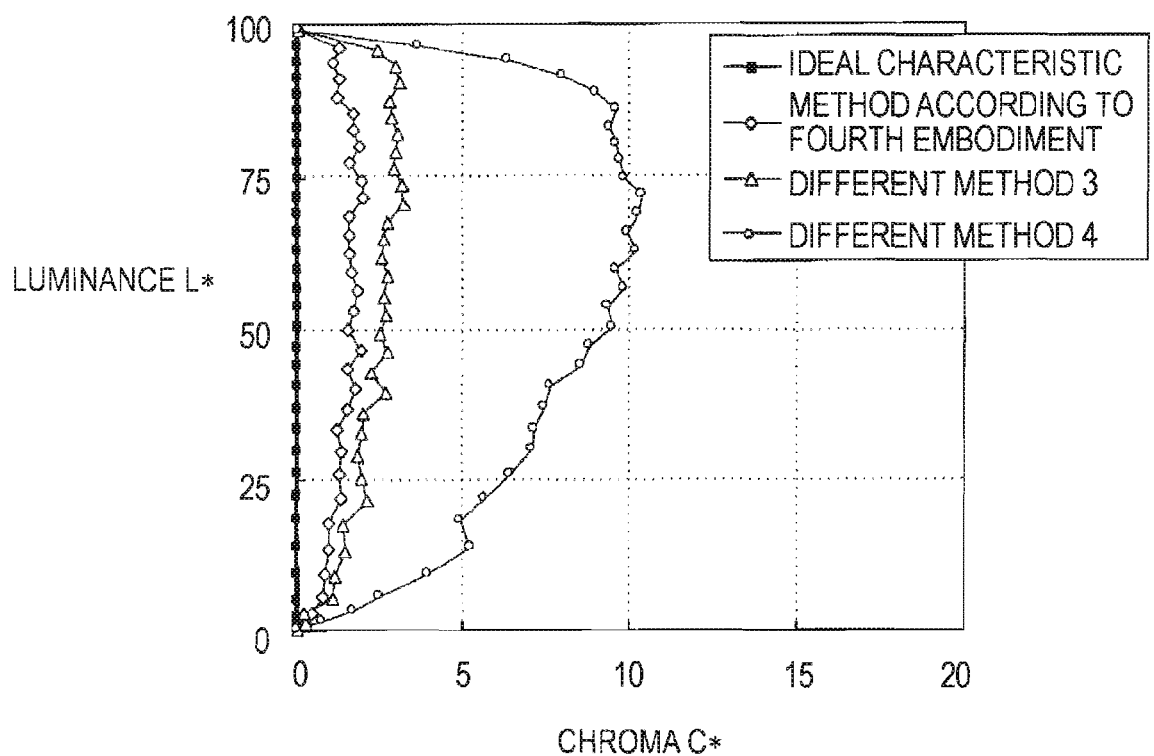
FIG. 34 is a graph showing results of comparison between the method according to the fourth embodiment and different methods.

FIG. 34 is a graph showing results obtained by performing the process of comparison. FIG. 34 indicates that, compared with different methods 3 and 4, in the method according to the fourth embodiment, the value of chroma C* corresponding to luminance L* is less and closer to an ideal value. Therefore, it is indicated that, when a gamma characteristic is set as a desired characteristic, in the method according to the fourth embodiment, no coloring occurs.

As described above, according to the fourth embodiment, in display of RGBC multiprimary colors, gamma-correction tables for use in gamma correction can be accurately set. In addition, output-1DLUT conversion is performed by using output 1DLUTs determined by the method according to the first embodiment, and gamma correction is performed by using the gamma-correction tables determined by the above method. Thus, a synergy of both makes it possible to perform conversion to appropriate characteristics.

A case in which the gamma value is set as "γ=2.2" has been described. However, a gamma-correction table can be accurately set for other gamma values. Also, a case in which output 1DLUTs determined by the method according to the first embodiment are used and in which gamma-correction tables determined by a similar method are used have been described. However, only in the case determining gamma-correction tables, the above method may be applied.

The invention is not limited to implementation of gamma correction by reading gamma-correction tables which are determined beforehand in the table storage memory 15c. In another example, after gamma-correction tables are determined by the above method in the image display apparatus, gamma correction can be performed by using the determined gamma-correction tables.

Figure 35:
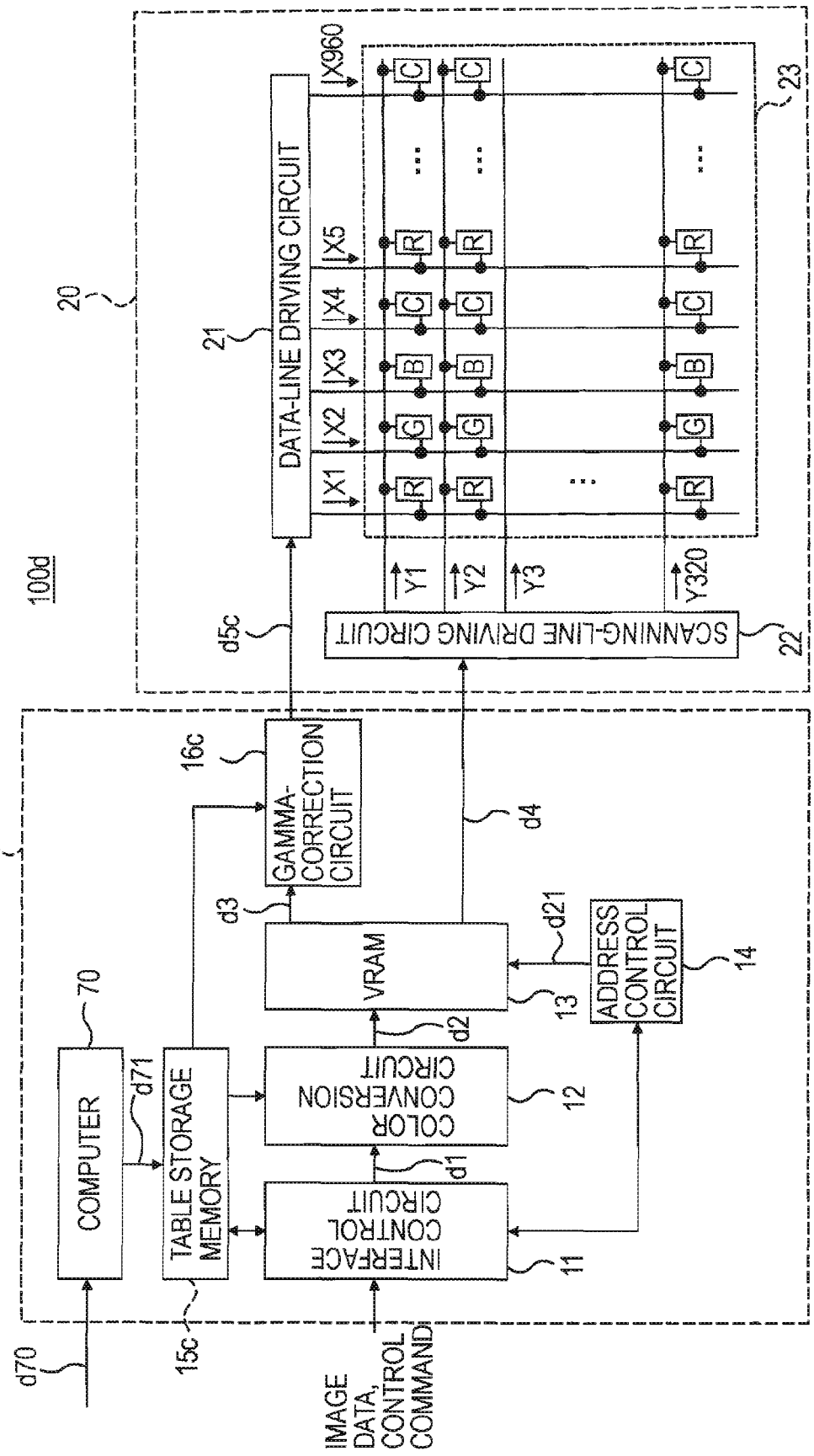
FIG. 35 is a block diagram showing the configuration of an image display apparatus according to a modification of the fourth embodiment.

FIG. 35 is a block diagram showing the configuration of an image display apparatus 100d according to another embodiment of the invention. The image display apparatus 100d differs in configuration from the image display apparatus 100c (see FIG. 26) in that its image processing unit 10d includes a computer 70. The computer 70 includes a central processing unit (CPU) and a read-only memory (ROM), which are not shown. The computer 70 receives, as an external input, a signal d70 corresponding to a gamma value. The CPU in the computer 70 reads and executes a tone-conversion-characteristic determining program stored in the ROM. This allows the computer 70 to function as a tristimulus-value determining unit and as a tone-conversion-characteristic determining unit, or to function as a tone-conversion-characteristic determining apparatus, thereby determining gamma-correction tables. The computer 70 writes the gamma-correction tables as data d71 in a table storage memory 15c. The invention is not limited to determination of gamma-correction tables by executing the tone-conversion-characteristic determining program stored in the computer 70. Furthermore, in a further embodiment, the computer 70 reads a tone-conversion-characteristic determining program stored on a recording medium (such as an optical disc), whereby the computer functions as the tristimulus-value determining unit and as the tone-conversion-characteristic determining unit to determine gamma-correction tables.

Modifications

The invention is also applicable to an image display apparatus using primary colors (for example, five or six primary colors) more than three primary colors. Also, the invention is also applicable to an image display apparatus including no VRAM. In addition, the invention is not limited to its application to an image display apparatus using a liquid crystal device. The invention is applicable to image display apparatuses, such as a CRT, a PDP, an OLED, and an FED, which two-dimensionally display images, and image display apparatuses, such as an LCP and a PTV, which project images. The above embodiments describe primary colors, such as R, G, B, and C, as specific examples of a plurality of colors used by image display apparatuses for displaying image data obtained by image processing. However, the invention is also applicable to an image display apparatus that uses, as the colors, a set of R, G, and B, a set of Y, C, and M which are their complementary colors, and colors, such as yellowish green and dark green, between the set of R, G, and B and the set of Y, C, and M.

In addition, the above embodiments describe a case in which all points (consecutive points) of output 1DLUTs and gamma-correction tables are determined. However, instead of determining all the points, decimation points (discrete points) of output 1DLUTs and gamma-correction tables can be determined. In this case, by performing interpolation calculation based on weighting in accordance with the decimation points and their positions, output-1DLUT conversion and gamma correction can be performed.

Furthermore, the invention is not limited to implementation of color conversion from three primary colors to four primary colors by diving a color reproduction region into quadrangular pyramids. Instead, color conversion can be performed by dividing a color reproduction region into hexahedrons.

Other Embodiments

The foregoing description uses R, G, B, and C as the plurality of colors (colored regions). However, the invention is not limited thereto, but enables determination of tone-conversion characteristics even in the case of using colored regions in a different set of four colors to form a pixel.

In this case, the colored regions in four colors include, among the visible light range (380 nm to 780 nm) in which the hue varies depending on the wavelength, a colored region (also called a "first colored region") having a hue of a blue range, a colored region (also called a "second colored region") having a hue of a red range, and colored regions (also called a "third colored region" and a "fourth colored region") having two hues selected from hues from blue to yellow. The term "range" is used in this context because, for example, the blue range includes colors such as violet and blue-green without being limited to a hue of pure blue. The red range includes orange without being limited to red. Each of the colored regions may be formed by a single colored layer and may be formed by overlaying a plurality of colored layers having different hues. In addition, the colored regions are described in hues. The hues can set colors in such a manner that chroma and lightness are appropriately changed.

Specific ranges of hues are as follows.

The colored region having a hue of a blue range is violet to blue-green, and is preferably indigo to blue.

The colored region having a hue of a red range is orange to red.

One selected colored region having a hue from blue to yellow is blue to green, and is preferably blue-green to green.

The other colored region having a hue from blue to yellow is green to orange, and is preferably green to yellow or green to yellow-green.

The colored regions do not use the same hue. For example, when two colored regions that have hues selected from blue to yellow use hues of a green range, for the green range for one colored region, the other colored region uses a hue of a blue or yellow-green range.

This makes it possible to realize color reproducibility which is broader than RGB colored regions of the related art.

Also, in representation of wavelength of light transmitted through each colored region, other specific examples of the colored regions are as follows.

The colored region having a hue of a blue range has 415 nm to 500 nm as a peak of the wavelength of light that passes through the colored region, and preferably has 435 nm to 485 nm.

The colored region having a hue of a red range has 600 nm or greater as a peak of the wavelength of light that passes through the colored region, and preferably has 605 nm or greater.

One selected colored region having a hue of blue to yellow has 485 nm to 535 nm as a peak of the wavelength of light that passes through the selected colored region, and preferably has 495 nm to 520 nm.

The other selected colored region having a hue of blue to yellow has 500 nm to 590 nm as a peak of the wavelength of light that passes through the other selected colored region, and preferably has 510 nm to 585 nm or 530 nm to 565 nm as the peak.

In the case of transmissive display, these wavelengths are values obtained when light from an illuminator passes through a color filter. In the case of reflective display, these wavelengths are values obtained when external light is reflected.

In representation of the xy chromaticity diagram, other specific examples of the colored regions in four colors are as follows.

The colored region having a hue of a blue range is represented by $x \leq 0.151$ and $y \leq 0.200$, preferably by $x \leq 0.151$ and $y \leq 0.056$, and more preferably by $0.134 \leq x \leq 0.151$ and $0.034 \leq y \leq 0.200$. It is represented further preferably by $0.134 \leq x \leq 0.151$ and $0.034 \leq y \leq 0.056$.

The colored region having a hue of a red range is represented by $0.520 \leq x$ and $y \leq 0.360$, preferably by $0.643 \leq x$ and $y \leq 0.333$, and more preferably by $0.550 \leq x \leq 0.690$ and $0.210 \leq y \leq 0.360$. It is further preferably represented by $0.643 \leq x \leq 0.690$ and $0.299 \leq y \leq 0.333$.

The one selected colored region having a hue of blue to yellow is represented by $x \leq 0.200$ and $0.210 \leq y$, preferably by $x \leq 0.164$ and $0.453 \leq y$, and more preferably represented by $0.080 \leq x \leq 0.200$ and $0.210 \leq y \leq 0.759$. It is further preferably represented by $0.098 \leq x \leq 0.164$ and $0.453 \leq y \leq 0.759$.

The selected other colored region having a hue of blue to yellow is represented by $0.257 \leq x$ and $0.450 \leq y$, preferably by $0.257 \leq x$ and $0.606 \leq y$, and more preferably represented by $0.257 \leq x \leq 0.520$ and $0.450 \leq y \leq 0.720$. It is further preferably represented by $0.257 \leq x \leq 0.357$ and $0.606 \leq y \leq 0.670$.

The xy chromaticity diagram representing the above colored regions contains, in the case of transmissive display, values obtained when light from an illuminator passes through a color filter, and, in the case of reflective display, values obtained when external light is reflected.

When, in these colored regions in four colors, subpixels have transmissive regions and reflective regions, the transmissive regions and the reflective regions can be also used in the above-described ranges.

When the colored regions in four colors in this embodiment are used, regarding the backlight, light-emitting diodes, fluorescent tubes, organic ELs, or the like, may be used as RGB light sources. Alternatively, a white light source may be used. The white light source may be generated by a blue emitter and a YAG fluorescent unit.

As the RGB light sources, the following are preferable.
For B, one having a wavelength peak of 435 nm to 485 nm.
For G, one having a wavelength peak of 520 nm to 545 nm.
For R, one having a wavelength peak of 610 nm to 650 nm.

By appropriately selecting the above colored regions depending on the wavelengths of the RGB light sources, a broader color reproducibility can be obtained. In addition, a light source that has a plurality of wavelength peaks of, for example, 450 nm and 565 nm, may be used.

Specific examples of the colored regions in four colors are as follows:
colored regions having hues of red, blue, green, and cyan (blue-green);
colored regions having hues of red, blue, green, and yellow;
colored regions having hues of red, blue, dark green, and yellow;
colored regions having hues of red, blue, emerald green, and yellow-green;
colored regions having hues of red, blue, emerald green, and yellow;
colored regions having hues of red, blue, dark green, and yellow-green; and
colored regions having hues of red, blue-green, dark green, and yellow-green.

The entire disclosure of Japanese Patent Application No. 2005-297269, filed Oct. 12, 2005 and 2005-303370, filed Oct. 18, 2005 are expressly incorporated by reference herein.

What is claimed is:

1. A tone-conversion-characteristic determining apparatus for determining tone-conversion characteristic for use in converting tone characteristic of original data so that targeted tone characteristic is obtained when display is performed by a display device, the tone-conversion-characteristic determining apparatus comprising:
   a one of tristimulus values X, Y, and Z for one of primary colors included in multiprimary colors determining unit that, on the basis of tristimulus values X, Y and Z corresponding to a tone characteristic value of the primary color, determines one of tristimulus values X, Y and Z, which is greater than the other tristimulus values; and
   a tone-conversion-characteristic determining unit that, on the basis of the tristimulus values determined by one of tristimulus values X, Y and Z determining unit, determines the tone-conversion characteristic so that the targeted tone characteristic is obtained.

2. The tone-conversion-characteristic determining apparatus according to claim 1, wherein:
   the tristimulus values correspond to a maximum tone characteristic value of the primary color; and
   the tristimulus value determining unit determines, as the tristimulus value, a greatest tristimulus value among the tristimulus values.

3. The tone-conversion-characteristic determining apparatus according to claim 1, wherein each of the targeted tone characteristic is such that a tone characteristic value obtained, for a normalized tone characteristic value of the original image data, by normalizing the tristimulus value, is linear.

4. The tone-conversion-characteristic determining apparatus according to claim 1, wherein each of the targeted tone characteristic is such that a tone value obtained, for a normalized tone characteristic value of the original image data, by normalizing the tristimulus value, is represented by a gamma characteristic prescribed on the basis of a specified gamma value.

5. The tone-conversion-characteristic determining apparatus according to claim 1, wherein:
   the multiprimary colors include red, green, blue, and cyan;
   the tristimulus values have value X, value Y, and value Z; and
   the tristimulus value determining unit determines, as the tristimulus value, value X for the red, value Y for the green, value Z for the blue, or value Y for the cyan.

6. The tone-conversion-characteristic determining apparatus according to claim 1, wherein:
   the multiprimary colors include red, green, blue, and yellow;
   the tristimulus values have value X, value Y, and value Z; and
   the tristimulus value determining unit determines, as the tristimulus value, value X for the red, value Y for the green, value Z for the blue, or value Y for the yellow.

7. The tone-conversion-characteristic determining apparatus according to claim 1, wherein:
   the multiprimary colors include red, green, blue, and white;
   the tristimulus values have value X, value Y, and value Z; and
   the tristimulus value determining unit determines, as the tristimulus value, value X for the red, value Y for the green, value Z for the blue, or value Y for the white.

8. The tone-conversion-characteristic determining apparatus according to claim 1, wherein colored regions in the colors include, in visible light ranges in which a hue of visible light changes depending on the wavelength of the visible light, a colored region having a hue of a blue range, a colored region having a hue of a red range, and two colored regions respectively having hues selected from hues of blue to yellow.

9. The tone-conversion-characteristic determining apparatus according to claim 1, wherein colored regions in the colors include a colored region in which a wavelength peak of light passing through the colored region is 415 to 500 nanometers, a colored region in which a wavelength peak of light passing through the colored region is 600 nanometers or greater, a colored region in which a wavelength peak of light passing through the colored region is 485 to 535 nanometers, and a colored region in which a wavelength peak of light passing through the colored region is 500 to 590 nanometers.

10. An image processing apparatus comprising:
    a storage unit that stores, as tables, the tone-conversion characteristic determined by the tone-conversion-characteristic determining apparatus according to claim 1; and
    an image processing unit that uses the tables stored in the storage unit to perform image processing on image data which is obtained such that the display device converts input image data into colors capable of being displayed by the display device.

11. A tone-conversion-characteristic determining method for determining tone-conversion characteristic for use in converting tone characteristic of original data so that targeted tone characteristic is obtained when display is performed by a display device, the tone-conversion-characteristic determining method comprising:
    determining, on the basis of tristimulus values X, Y and Z corresponding to a tone characteristic value of one of primary colors included in multiprimary colors, one of tristimulus values X, Y and Z, which is greater than the other tristimulus values; and determining, on the basis of the determined tristimulus value of the primary color, the tone-conversion characteristic so that the targeted tone characteristic is obtained.

12. A tone-conversion-characteristic computer-readable medium storing a determining program to be executed by a computer, the program allowing the computer to function as:
   one of tristimulus values X, Y and Z determining means that, on the basis of tristimulus values X, Y and Z corresponding to a tone value of one of primary colors included in multiprimary colors, determines one of tristimulus values X, Y and Z, which is greater than the other tristimulus values; and
   tone-conversion-characteristic determining means that, on the basis of the tristimulus values determined by one of tristimulus values X, Y and Z determining means, determines tone-conversion characteristic for use in converting tone characteristic of the original image data that the targeted tone characteristic is obtained when display is performed by the display device.

13. An image processing apparatus comprising:
   a one of tristimulus values X, Y, and Z for one of primary colors included in multiprimary colors determining unit that, on the basis of tristimulus values X, Y and Z corresponding to a tone characteristic value of the primary colors determines one of tristimulus values X, Y and Z, which is greater than the other tristimulus values; and
   a tone-conversion-characteristic determining unit that, on the basis of the tristimulus values determined by one of tristimulus values X, Y and Z determining unit, determines tone-conversion characteristic for use in converting tone characteristic of the original image data so that the targeted tone characteristic is obtained when display is performed by the display device; and
   an image processing unit that performs image processing by using the tone-conversion characteristic.

14. The image processing apparatus according to claim 13, wherein:
   the tone-conversion-characteristic determining unit determines the tone-conversion characteristic on the basis of a specified gamma value; and
   the image processing unit performs gamma correction based on the determined tone-conversion characteristic.

15. An image display apparatus comprising:
   the image processing apparatus according to claim 13; and
   a display device that displays image data which is obtained by the image processing of the image processing apparatus.

* * * * *